(12) United States Patent
Shin et al.

(10) Patent No.: US 12,463,559 B2
(45) Date of Patent: Nov. 4, 2025

(54) SWITCHABLE POWER GENERATION IN TRIBOELECTRIC NANOGENERATORS

(71) Applicant: THE UNIVERSITY OF HONG KONG, Hong Kong (CN)

(72) Inventors: Dongmyeong Shin, West Kowloon (CN); Jiaming Zhou, Hong Kong (CN); Eunjong Kim, Hong Kong (CN); Xiaoting Ma, Hong Kong (CN); Jingyi Gao, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 300 days.

(21) Appl. No.: 18/126,026

(22) Filed: Mar. 24, 2023

(65) Prior Publication Data

US 2024/0322711 A1  Sep. 26, 2024

(51) Int. Cl.
*H02N 1/04* (2006.01)
(52) U.S. Cl.
CPC ..................................... *H02N 1/04* (2013.01)
(58) Field of Classification Search
CPC .......................................................... H02N 1/04
USPC ......................................................... 310/310
See application file for complete search history.

(56) References Cited

U.S. PATENT DOCUMENTS

2020/0244189 A1* 7/2020 Polesel-Maris .......... H02N 1/04
2021/0126556 A1* 4/2021 Wang ....................... H02N 1/04

FOREIGN PATENT DOCUMENTS

CN  113489122 A  * 10/2021
KR  20200059692 A  *  5/2020

OTHER PUBLICATIONS

CN113489122A English translation (Year: 2025).*
KR20200059692A English translation (Year: 2025).*
Ates, H. C. et al. End-to-end design of wearable sensors. Nat. Rev. Mater. 7, pp. 887-907 (2022).
Lin, M., Hu, H., Zhou, S. & Xu, S., Soft wearable devices for deep-tissue sensing, Nat. Rev. Mater. 7, pp. 850-869 (2022).
Iqbal, S.M.A., Mahgoub, I., Du, E. et al., Advances in healthcare wearable devices, npj Flex. Electron. 5, 9, pp. 1-14 (2021).
Yang, Q. et al., Categorizing wearable batteries: Unidirectional and omnidirectional deformable batteries, Matter 4, pp. 3146-3160 (2021).

(Continued)

*Primary Examiner* — Christopher M Koehler
*Assistant Examiner* — Viswanathan Subramanian
(74) *Attorney, Agent, or Firm* — Leason Ellis LLP

(57) ABSTRACT

A switchable triboelectric nanogenerator (s-TENG) which obtains energy by utilizing the electrostatic potential between water droplets and frictional surfaces. The s-TENG device includes an ITO film substrate as an electrode, a SU-8 mold grid located on the ITO film substrate and forming an array of air gaps as an air breakdown region, and a FEP film on the SU-8 mold grid as the surface of the friction layer. A water source is variably positioned at a distance from and at an angle to the s-TENG device so that water droplets contact the friction layer, so that direct current is obtained without the use of a rectifier due to electrostatic induction causing break down in the air breakdown region of the SU-8 mold grid.

11 Claims, 19 Drawing Sheets

(56) References Cited

OTHER PUBLICATIONS

Wang, X. F. et al., Flexible Energy-Storage Devices: Design Consideration and Recent Progress, Adv. Mater. 26, pp. 4763-4782 (2014).
Armand, M. & Tarascon, J.-M. Building better batteries, Nature 451, pp. 652-657 (2008).
Tarascon, J.-M. & Armand, M. Issues and challenges facing rechargeable lithium batteries, Nature 414, pp. 359-367 (2001).
Bu, F., Zhou, W., Xu, Y. et al., Recent developments of advanced micro-supercapacitors: design, fabrication and applications, npj Flex. Electron. 4, 31, pp. 1-16 (2020).
Qin, H., Liu, P., Chen, C. et al., A multi-responsive healable supercapacitor, Nat. Commun. 12, 4297, pp. 1-11 (2021).
Zi, Y. L. & Wang, Z. L., Nanogenerators: An emerging technology towards nanoenergy, APL Mater. 5, 074103, pp. 1-14 (2017).
Xu, S. et al., Self-powered nanowire devices, Nat. Nanotech. 5, pp. 366-373 (2010).
Wang, Z. L., Triboelectric nanogenerators as new energy technology for self-powered systems and as active mechanical and chemical sensors, ACS Nano 7, pp. 9533-9557 (2013).
Chen, J. et al., Networks of triboelectric nanogenerators for harvesting water wave energy: a potential approach toward blue energy, ACS Nano 9, pp. 3324-3331 (2015).
Yoon, H. J., Ryu, H. & Kim, S. W., Sustainable powering triboelectric nanogenerators: Approaches and the path towards efficient use, Nano Energy 51, pp. 270-285 (2018).
Wu, C. S., Wang, A. C., Ding, W. B., Guo, H. Y. & Wang, Z. L., Triboelectric Nanogenerator: A Foundation of the Energy for the New Era, Adv. Energy Mater. 9, 1802906, pp. 1-25 (2019).
Wang, Z. L., Triboelectric Nanogenerator (TENG)—Sparking an Energy and Sensor Revolution, Adv. Energy Mater. 10, 2000137, pp. 2-6 (2020).
Fan, F. R., Tian, Z. Q. & Wang, Z. L., Flexible triboelectric generator!, Nano Energy 1, pp. 328-334 (2012).
Jiang, T. et al., Robust Swing-Structured Triboelectric Nanogenerator for Efficient Blue Energy Harvesting, Adv. Energy Mater. 10, 2000064, pp. 1-9 (2020).
Hinchet, R. et al., Transcutaneous ultrasound energy harvesting using capacitive triboelectric technology, Science 365, pp. 1-4 (2019).
Kim, J. et al., Ultrahigh Power Output from Triboelectric Nanogenerator Based on Serrated Electrode via Spark Discharge, Adv. Energy Mater. 10, 2002312, pp. 1-7 (2020).
Yoon, H. J. et al., Microdischarge-Based Direct Current Triboelectric Nanogenerator via Accumulation of Triboelectric Charge in Atmospheric Condition, Adv. Energy Mater. 10, 2000730, pp. 1-7 (2020).
Jeong, J. et al., A Sustainable and Flexible Microbrush-Faced Triboelectric Generator for Portable/Wearable Applications, Adv. Mater. 33, 2102530, pp. 1-9 (2021).
Kim, T. et al., Versatile nanodot-patterned Gore-Tex fabric for multiple energy harvesting in wearable and aerodynamic nanogenerators, Nano Energy 54, pp. 209-217 (2018).
Phan, H. et al., Aerodynamic and aeroelastic flutters driven triboelectric nanogenerators for harvesting broadband airflow energy, Nano Energy 33, pp. 476-484 (2017).
Amangeldinova, Y., Ma, X. T., Kim, J. M., Shin, D. M. & Hwang, Y. H., Cooperativity of Silver Nanostructures upon Electric Power Generation in Triboelectric Polyimide Layers, Adv. Eng. Mater. 24, 2200226, pp. 1-7 (2022).
Guo, H. et al., A Water-Proof Triboelectric-Electromagnetic Hybrid Generator for Energy Harvesting in Harsh Environments, Adv. Energy Mater. 6, 1501593, pp. 1-7 (2016).
Wang Z. et al., Ultrahigh Electricity Generation from Low-Frequency Mechanical Energy by Efficient Energy Management, Joule 5, pp. 441-455 (2021).
Liu, J. et al., Direct-current triboelectricity generation by a sliding Schottky nanocontact on $MoS_2$ multilayers, Nat. Nanotechnol. 13, pp. 112-116 (2018).
Huang, X., Xiang, X., Nie, J. et al., Microscale Schottky superlubric generator with high direct-current density and ultralong life, Nat. Commun. 12, 2268, pp. 1-10 (2021).
Wang, J. L. et al. Cylindrical Direct-Current Triboelectric Nanogenerator with Constant Output Current. Adv. Energy Mater. 10, 1904227, pp. 1-10 (2020).
Chen, P. et al., Rationally segmented triboelectric nanogenerator with a constant direct-current output and low crest factor, Energ. Environ. Sci. 14, pp. 4523-4532 (2021).
Cheng, R. W. et al., High output direct-current power fabrics based on the air breakdown effect, Energ. Environ. Sci. 14, pp. 2460-2471 (2021).
Liu, D. et al., A constant current triboelectric nanogenerator arising from electrostatic breakdown, Sci. Adv. 5, eaav6437, pp. 1-8 (2019).
Josserand, C. & Thoroddsen, S. T., Drop Impact on a Solid Surface, Annu. Rev. Fluid Mech. 48, pp. 365-391 (2016).
Visser, C. W. et al., Dynamics of high-speed micro-drop impact: numerical simulations and experiments at frame-to-frame times below 100 ns, Soft Matter 11, pp. 1708-1722 (2015).
Chandra, S. & Avedisian, C. T., On the Collision of a Droplet with a Solid-Surface, Proc. R. Soc. Lond. A 432, pp. 13-41 (1991).
PasandidehFard, M., Qiao, Y. M., Chandra, S. & Mostaghimi, J. Capillary effects during droplet impact on a solid surface, Phys. Fluids 8, pp. 650-659 (1996).
Yonemoto, Y. & Kunugi, T., Analytical consideration of liquid droplet impingement on solid surfaces, Sci. Rep. 7, 2362, pp. 1-11 (2017).
Antonsson, E. K. & Mann, R. W., The Frequency Content of Gait, J. Biomech. 18, pp. 39-47 (1985).
MacKenzie, J. D. & Ho, C., Perspectives on Energy Storage for Flexible Electronic Systems, Proc. IEEE 103, pp. 535-553 (2015).
Mannion, D. P., Comparing Low Power Wireless Technologies—Part 2, https://www.digikey.be/nl/articles/comparing-low-power-wireless-technologies-part-2 Retrieved 2017, pp. 12-14.
Lee, J. W., Ye, B. U. & Baik, J. M., Research Update: Recent progress in the development of effective dielectrics for high-output triboelectric nanogeneratorm, APL Mater. 5, 073802, pp. 1-12 (2017).

\* cited by examiner

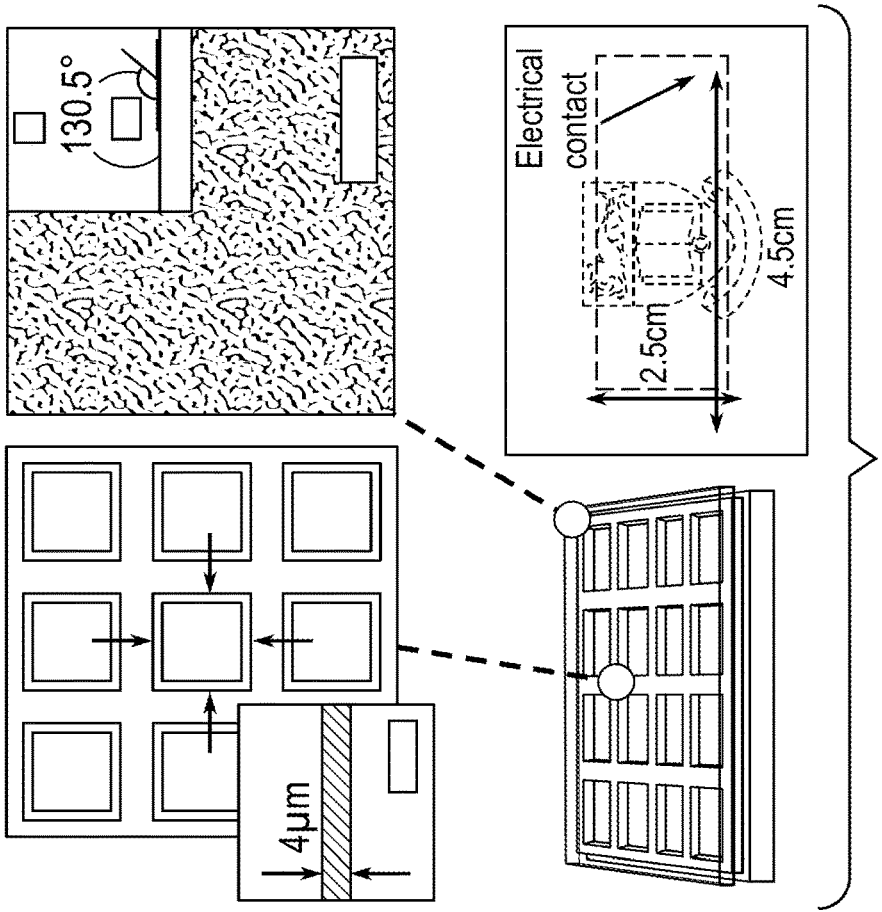
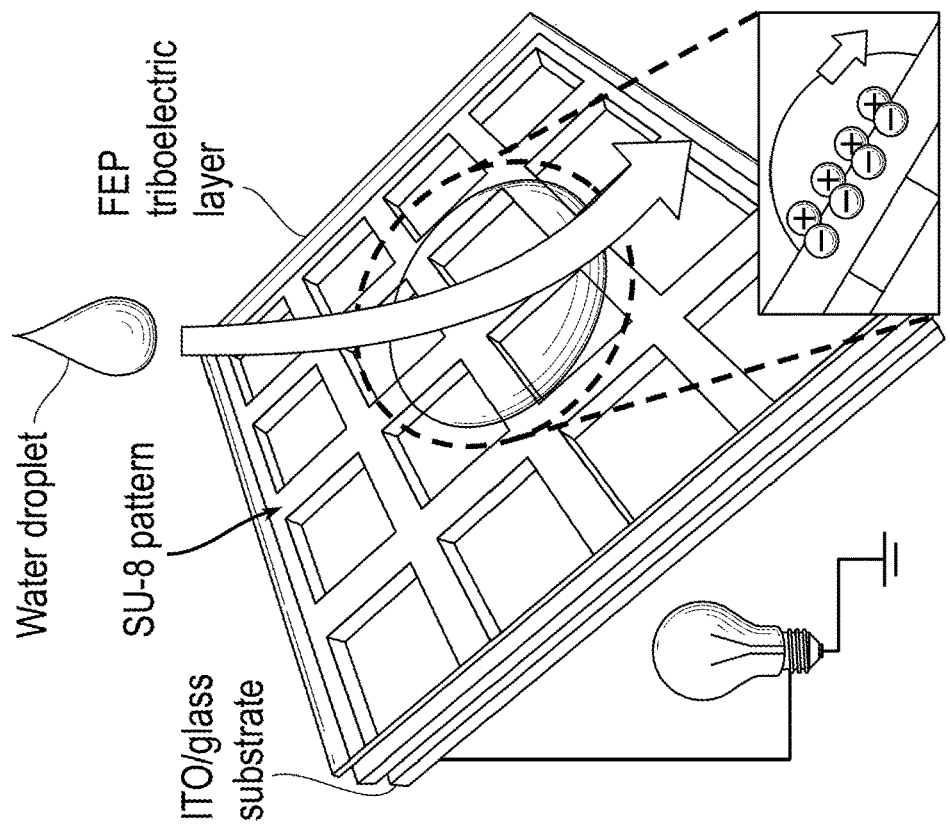

1) Normal TENG mode

2) Rectified TENG mode a) Normal TENG mode b) Rectified TENG mode

FIG. 4A
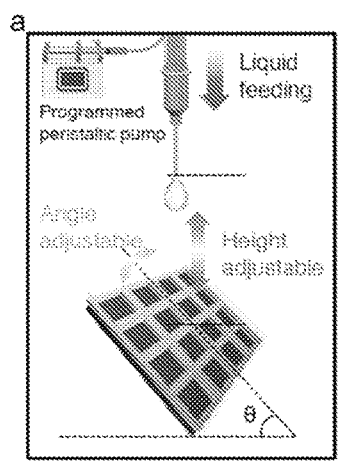
FIG. 4B
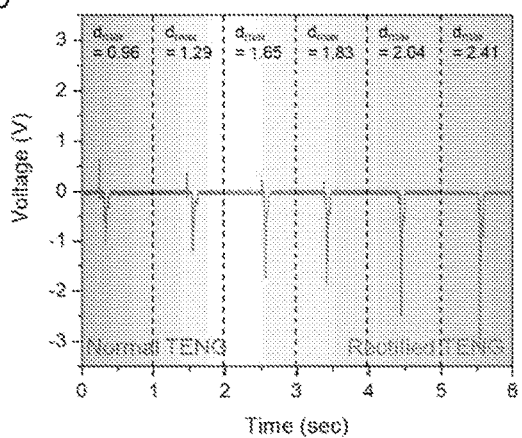
FIG. 4C
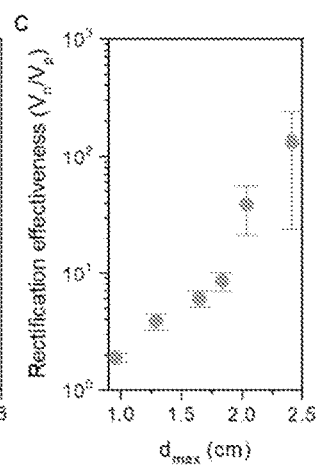
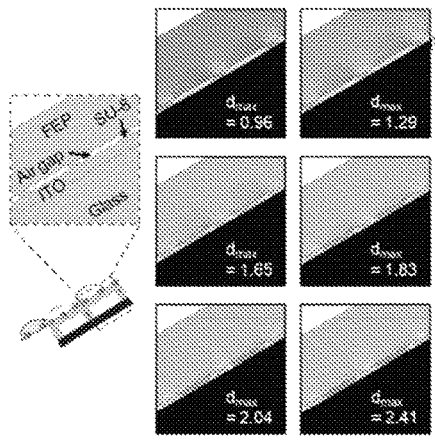
FIG. 4D
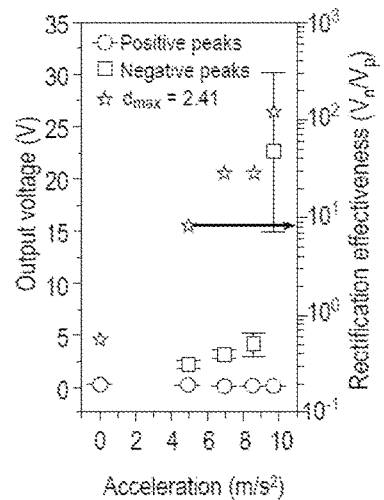
FIG. 4E
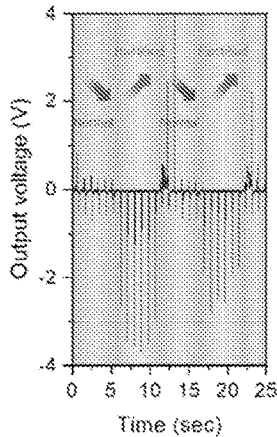
FIG. 4F FIG. 5A  FIG. 5B  FIG. 5C
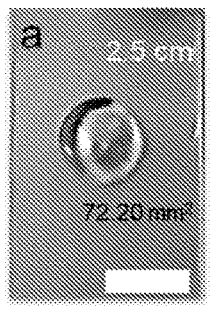 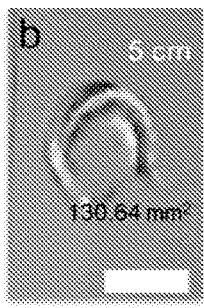 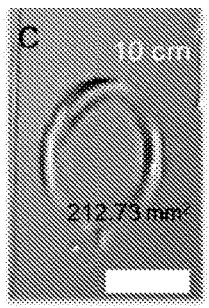
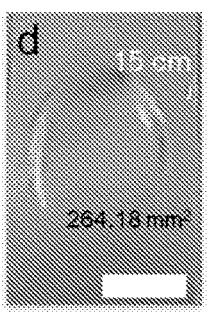 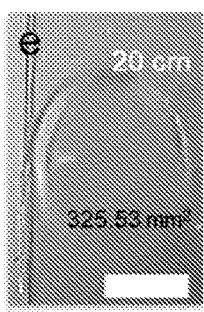 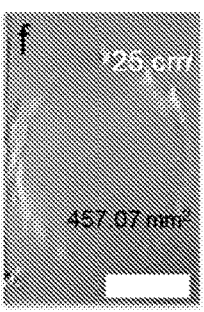
FIG. 5D  FIG. 5E  FIG. 5F
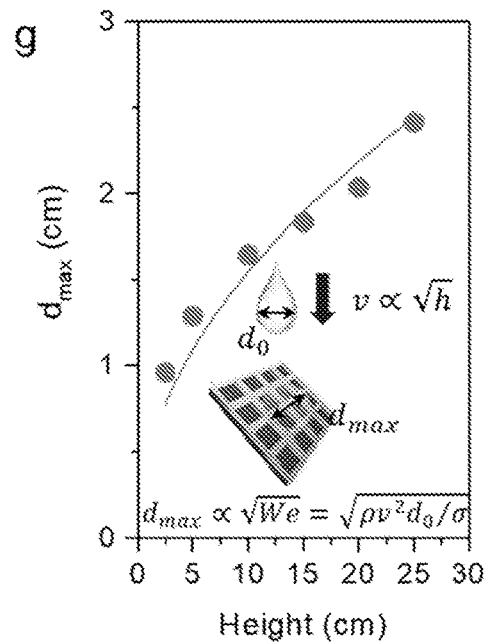
FIG. 5G

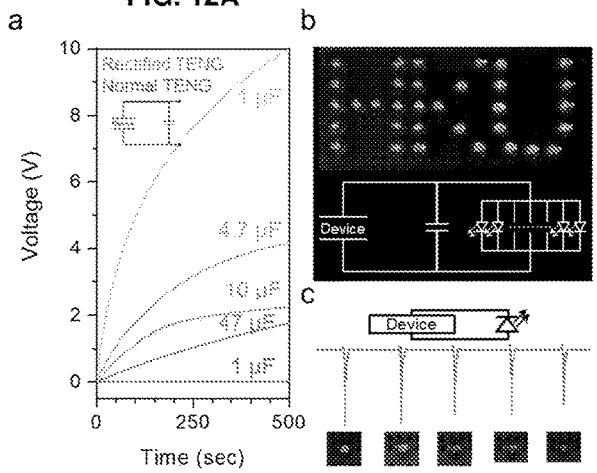
FIG. 12A
FIG. 12B
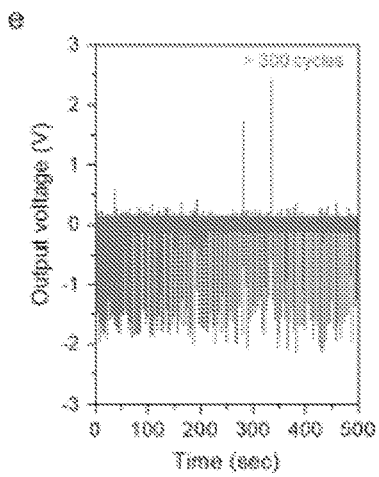
FIG. 12C
FIG. 12E
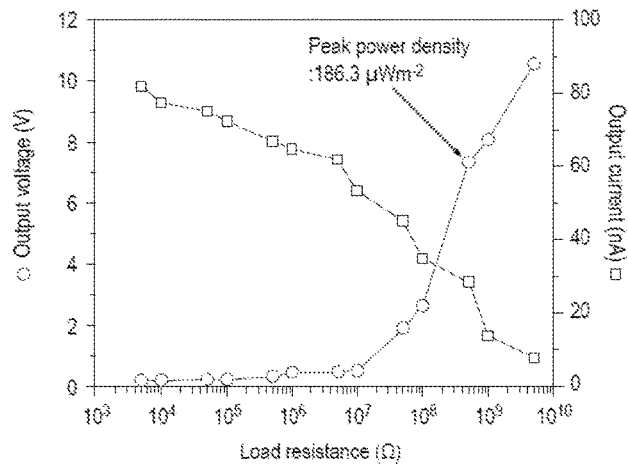
FIG. 12D
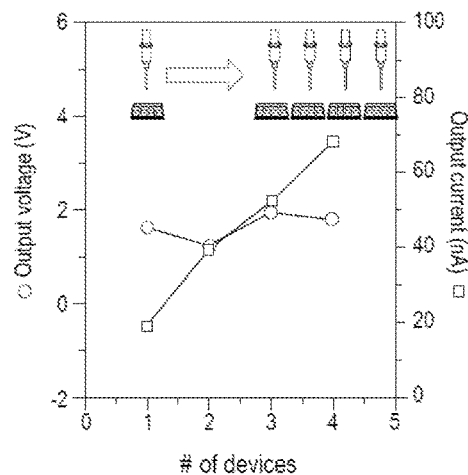
FIG. 12F

FIG. 13A
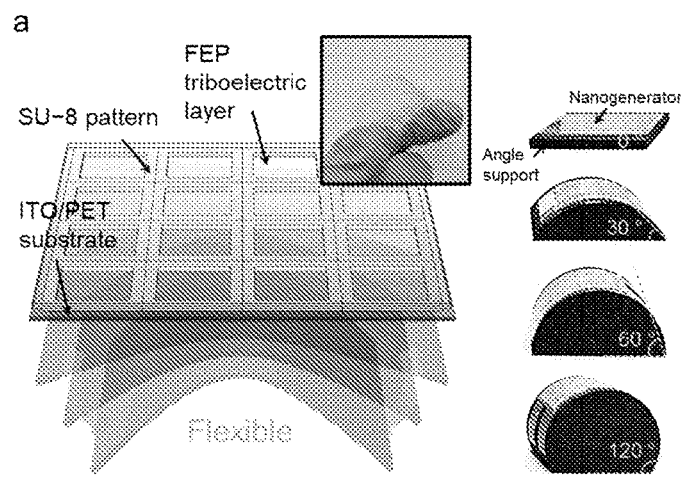
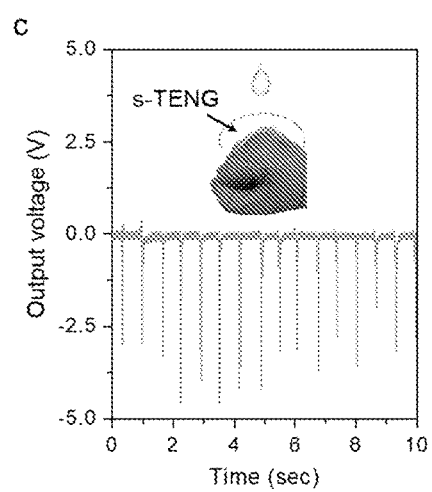
FIG. 13C
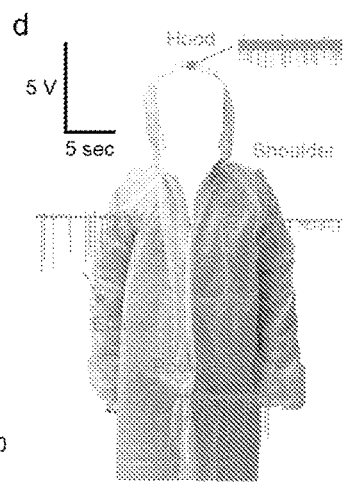
FIG. 13D
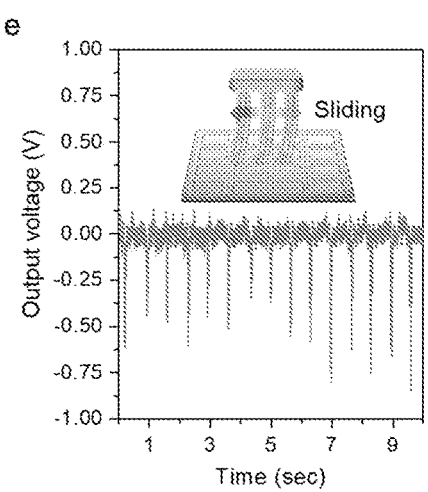
FIG. 13E

SWITCHABLE POWER GENERATION IN TRIBOELECTRIC NANOGENERATORS

FIELD OF THE INVENTION

The present invention relates to triboelectric generators and, more particularly, to triboelectric generators that can be used to power wearable devices where energy harvesting is achieved by body heat, body movement and light.

BACKGROUND OF THE INVENTION

With the overwhelming demands of modern, efficient and high standards of living, one major development in electronics has been the conceptual shift away from stationary electronics toward wearable and implantable electronics, which are emerging as a key building block of a smart city. The wearable devices can enrich our daily lives by exchanging information without needing human intervention [1-3], thereby requiring the devices to be continuously powered [4]. Although state-of-the-art energy storage technologies, such as lithium-ion batteries and supercapacitors, are mature and can provide a stable power supply for wearable electronics [5-9], they still require regular recharging.

Recently, a new paradigm of "self-powering" devices (SPD) has emerged to address the these issues. These SPDs feature integrated energy harvesters with energy storage that provide a stable power supply without the need to plug into the electrical grid to provide external power for operation or for recharging a storage device. Thus, the energy harvesting technologies for SPDs need to be independent, sustainable, and maintenance-free [10]. Moreover, for wearable devices, energy harvesting is limited to the body surface, such as body heat, body movement, and light. In this regard, triboelectric nanogenerators (TENGs) have attracted considerable attention due in large part to their lightweight, simple fabrication, diversity in material selection, and high energy conversion efficiency [11-16]. However, a power type mismatch between supply and demand limits their direct implementation into wearable self-powered electronics.

TENGs are mechanical energy harvesting devices based on the mechanism of contact electrification and electrostatic induction [17]. The transient electron flows generated from contact and release are determined by electrostatic induction and relaxation so that their directions inevitably oppose each other, yielding an alternative current (AC) output. The power output of TENGs has dramatically advanced in the past few years, and state-of-the-art TENGs can now yield an improved power output of several hundred volts and micro amperes [15, 16 and 18-26]. See Yun et al., "Interdigital electrode based triboelectric nanogenerator for effective energy harvesting from water," Nano Energy, Volume 36, June 2017, pages 233-240, which uses planar, cone and cylinder shaped interdigital electrode (IDE) based TENGs to generate AC voltage. Further, Zhao et al., "Cumulative charging behavior of water droplet driven freestanding triboelectric nanogenerators toward hydrodynamic energy harvesting." Journal of Materials Chemistry A, Issue 16, (2020) discloses TENGs with glass bases that produce AC voltage. In addition, see Liu et al., "A constant current triboelectric nanogenerator arising from electrostatic breakdown," Science Advances Vol. 5, No. 4, 4 Apr. 2019, which discloses a TENG that generates a constant DC output to drive electronic devices based on a sliding acrylic substrate.

However, as noted, TENGs still suffer from a power mismatch between supply and demand, including but not limited to the voltage mismatch, unstable output, and alternating power peak. In particular, the AC output needs to be rectified with the help of rigid electrical circuit components in order to serve as a power module in SPDs, limiting the direct incorporation of flexible TENGs into wearable SPDs. In particular, if the traditional triboelectric nanogenerator is to be directly applied to the equipment that needs a power supply, an external rectifier is required, which also greatly reduces its portability.

Furthermore, the internal resistance of the circuit components leads to energy loss. Although these components exhibit low energy losses between 5% and 30%, such power drops are especially significant for the low power output of TENGs. To take advantage of TENGs as wearable energy harvesters, output power management is urgently required for compact and efficient integration. Progress has been achieved in various areas related to rectifier-free TENGs using the sliding Schottky nanocontact [28, 29], phasing coupling [30,31] and electrostatic breakdown [32, 33]. However, a continuous rectified output has been realized only using the fast and periodic sliding working mode, which is likely not suitable for wearable applications.

SUMMARY OF THE INVENTION

The present invention is a novel triboelectric nanogenerator which obtains energy by utilizing the electrostatic potential between water droplets and frictional surfaces. Inspired by the lightning phenomenon in the natural environment, the invention uses air breakdown technology to obtain a rectifier-free triboelectric nanogenerator. This triboelectric nanogenerator has three layers: an ITO film substrate as the electrode, an SU-8 grid as the air breakdown region, and FEP film as the surface of the friction layer. SU-8 is an epoxy resin photoresist material. After the water droplet comes into contact with the friction surface, the electrical signal due to electrostatic induction will break down the SU-8 layer and be directly transferred to the device that needs to be powered through the electrode. This droplet-based triboelectric nanogenerator has a DC output, is flexible and wearable, and can adapt to various surfaces, such as raincoats and caves without additional rectifiers. At the same time, its surface area can be freely controlled to achieve customized effects.

This triboelectric nanogenerator has great application potential in wearable, intelligent devices and in other fields. In the present invention, when the water drop hits the friction surface to reach the maximum diffusion area, it generates a sufficiently large breakdown voltage with the surface, so that electrons can pass through the SU-8 layer to reach the electrode layer so that a direct current signal is generated at this time. Utilizing the breakdown voltage, the invention can still obtain unidirectional electrical signals when water droplets are periodically falling. At the same time, the flexible substrate can be attached to different surfaces to achieve efficient utilization.

The water droplet-based direct current triboelectric nanogenerator of the present invention utilizes the diffusion area of water droplets on the friction surface. When the diffusion area reaches the maximum, the generated electrostatic potential will break down the air and generate a unidirectional direct current signal. Integrating the sandwich structure on flexible ITO substrates can lead to flexible portable devices. Compared with the traditional triboelectric nanogenerator, this invention improves the wearable device's wearability and eliminates the need for a rectifier, which greatly reduces the threshold and difficulty of use.

The TENGs of the present invention have a convertible rectification feature, in which the direction of the charge flow generated by the TENGs is systematically controlled by electrostatic breakdown over the course of slow and random mechanical stimuli, benefiting its integration into wearable electronics. Without any circuit component, the switchable TENG exhibits remarkable rectification capabilities and a high ability to switch in the power mode, together with stable outputs over the cycles and design flexibility in different platforms. Triboelectrification with fabric counter materials potentially renders this TENG a versatile power module for wearable electronics.

Thus, the invention is a new product with a rectified triboelectric nanogenerator output. Compared with existing water droplet-based triboelectric nanogenerators, the present invention omits the need for a rectifier during use, so that the application range is wider and the volume is smaller. At the same time, by preparing it on a flexible substrate, it can be applied in the field of flexible wearables. In the prior art only a continuous rectified output has been realized by using a fast and periodic sliding working mode, but the present invention works well under slow and random mechanical stimuli.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1A is a schematic illustration of a switchable TENG (s-TENG) in which airgaps between the triboelectrification layer and an electrode enable control over the electron flow direction, FIG. 1B illustrates a SU-8 photoresist mold with a patterned square pore (inset indicates the cross-sectional image of the SU-8 mold), FIG. 1C shows the morphology of modified FEP film (inset depicts the hydrophobicity of FEP film), FIG. 1D is an optical image of an "as-fabricated" s-TENG.

FIG. 4A is a schematic of measurement apparatus where the droplet altitude and sliding slope are systematically regulated, FIG. 4B shows the output voltage of an s-TENG with various maximum spreading diameters of the droplet on the s-TENG (0.96, 1.29, 1.65, 1.83, 2.04, and 2.41), FIG. 4C shows a graph of the rectification effectiveness, which is defined as the ratio of negative to positive peaks, of differing maximum spreading diameters, FIG. 4D shows the calculated electric field within the airgap at different maximum spreading diameters, FIG. 4E shows the output voltage and rectification effectiveness as a function of the droplet sliding acceleration and FIG. 4F shows the switching ability of output voltage in s-TENG;

FIG. 5A-5F are optical images of water droplets impinging on the s-TENG surface and FIG. 5G shows the maximum spreading diameter as a function of altitude;

FIG. 12A shows the capacitive charging during power management in the s-TENGs with normal and rectified TENGs (inset shows an equivalent circuit for capacitive charging), FIG. 12B shows a photo of LED lighting with the capacitor charged, FIG. 12C shows the output voltage of the s-TENG with a direct connection to a single LED and corresponding photos of the LED, FIG. 12D shows the output powers as a function of the load resistance for rectified TENG, FIG. 12E shows the robustness and durability of the s-TENG over 300 cycles and FIG. 12F shows the output voltages from s-TENGs with different numbers of devices, from one to four layers, with parallel connection;

FIG. 13A shows the structure of a flexible s-TENG (inset images represent the flexibility of the "as-fabricated" device (top) and angle supports employed (right)), FIG. 13C shows the output voltage of an s-TENG mounted on the back of the hand of a person, FIG. 13D shows the output voltage of s-TENGs mounted on a rain coat upon applying broadband raindrops and FIG. 13E shows the versatility of the s-TENG with sliding;

DETAILED DESCRIPTION OF THE INVENTION

Figure 1E:
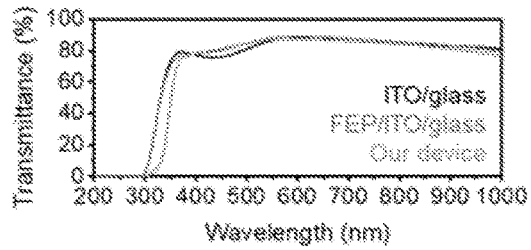
FIG. 1E is a graph of the transparency of the s-TENG in the visible range.

The structure of switchable triboelectric nanogenerators (s-TENGs) is schematically illustrated in FIG. 1A. The s-TENGs are based on an elastic SU-8 mold patterned on an indium tin oxide-coated glass (ITO/glass) substrate, covered with a fluorinated ethylene propylene (FEP) film as a triboelectrification layer, thereby forming an array of air gaps for electrostatic breakdown. Water droplets are used as a counter triboelectrification material, and when the droplets impinged onto the s-TENGs they donate the electrons to the FEP film while sliding down the film throughout the device. In order to fabricate the s-TENGs, a 4-μm-thick SU-8 photoresist mold, with patterned square pores of 40 μm per side and a pitch of 50 μm, was defined on the ITO/glass substrate by photolithography (FIG. 1B). In FIG. 1B the scale bar is 100 µm and the insert is a cross-sectional image of the SU-8 mold at a scale bar of 10 µm. The morphology of an FEP adhesive film attached on top of the SU-8 mold and treated by a simple reactive-ion etching (RIE) process optimized for nanostructure fabrication ($CF_4$, Ar, and $O_2$, 100 W, 30 min conditions) is shown in FIG. 1C. The scale bar is 100 nm in FIG. 1C and the inset image in FIG. 1C indicates that the treated FEP surface became more hydrophobic (contact angle=~130.5°) compared to the pristine film (contact angle=~102°), which facilitates not only contact electrification but also the rolling-off of water droplets over the FEP surface. A transparent s-TENG with a dimension of 25×45 $mm^2$ was obtained (FIG. 1D). The transmittance in the visible range (380-750 nm) of the s-TENG of the present invention is ~85% (FIG. 1E), suggesting that these s-TENGs can be potentially mounted on top of any surface without disturbing the aesthetics of the surface.

Figure 1F:
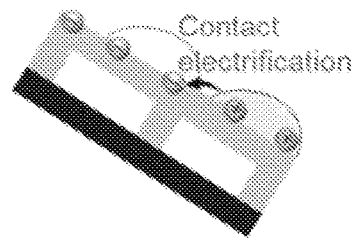
FIG. 1F is a schematic diagram of two different working modes: normal TENG and rectified TENG
Figure 1F:
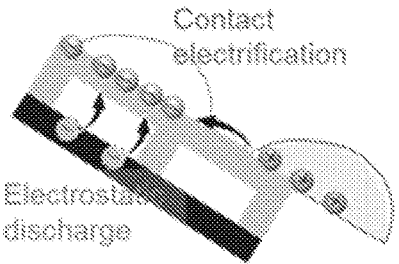
Figure 1G:
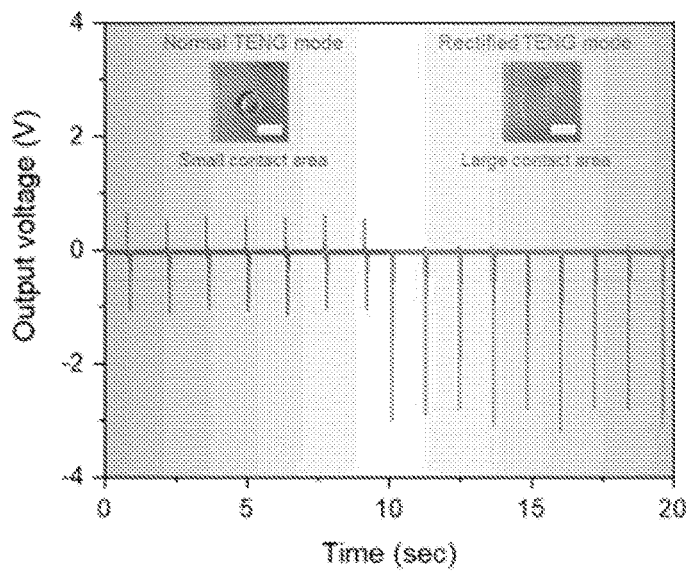
FIG. 1G shows representative output voltages of normal and rectified TENG modes (insets display the contact area made by the droplet)
Figure 2A:
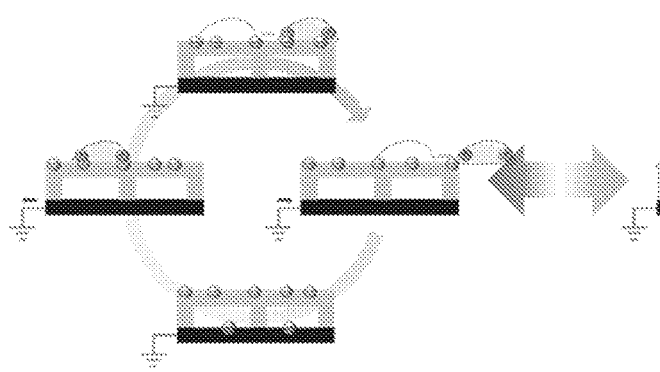
FIG. 2A is a schematic illustration of the working principles for a normal TENG mode and FIG. 2B shows the working principles for a rectified TENG mode.
Figure 2B:
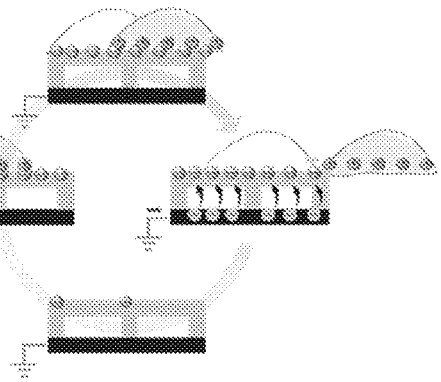
Figure 3:
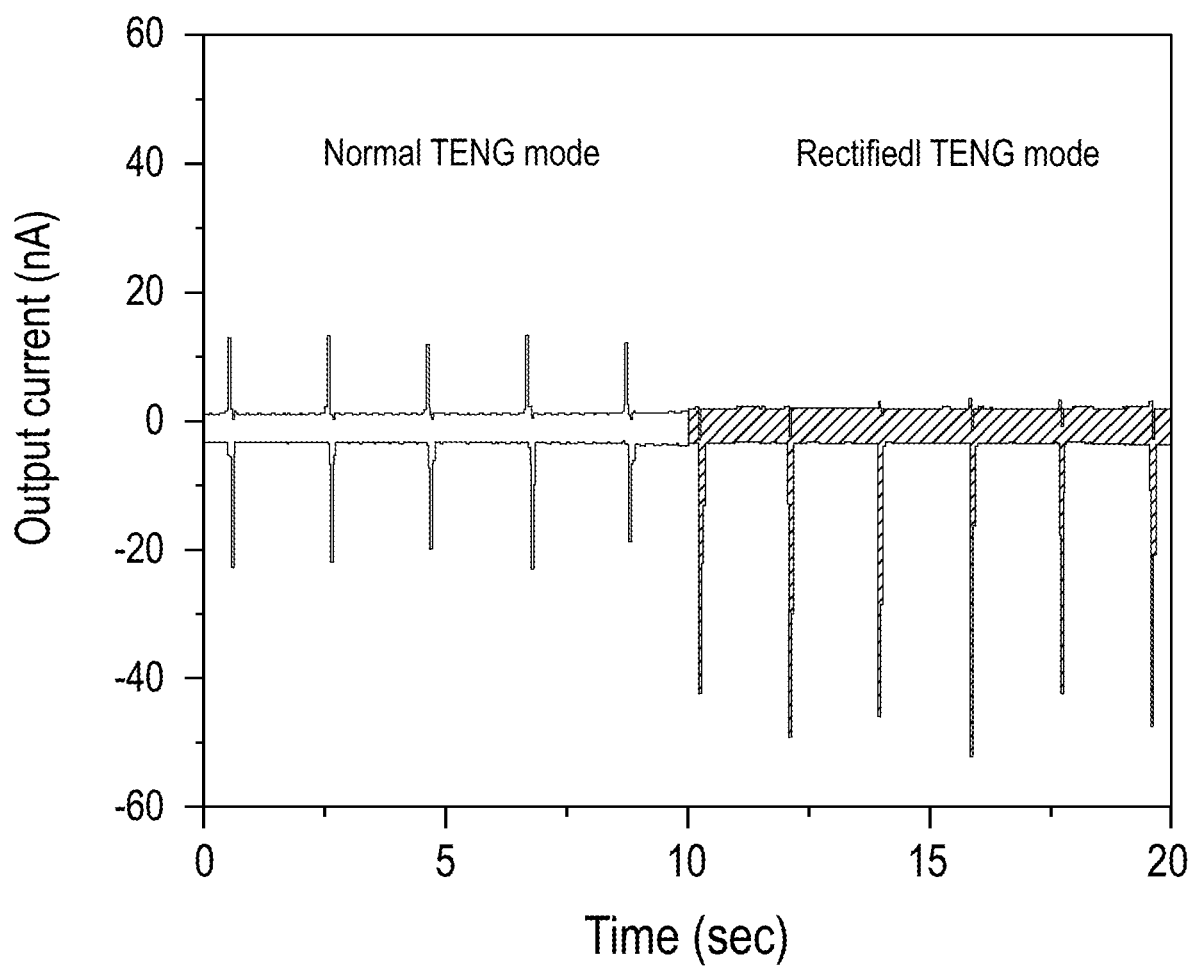
FIG. 3 shows representative output currents of normal and rectified TENG modes.

Impinging droplets onto the s-TENG's surface results in contact electrification, negatively charging the surface of the FEP triboelectrification layer. A schematic illustration of charge distributions over the s-TENG's surface in two different working modes is shown in FIG. 1F, normal TENG mode and rectified TENG mode. After the water droplet rolls off the s-TENG's surface, the charge amount transferred onto the FEP layer relies on the droplet size sliding down the surface due to the contact area difference. The electrostatic field developed by the surface charge induces the transient electron flow from the electron reservoir to the device electrode, and these electrons return back to the reservoir when the surface charges are screened by the next water droplets (normal TENG mode; FIG. 2A), yielding the negative and positive output signals, respectively (left signals in FIG. 1G (scale bar of 10 mm) and FIG. 3). FIG. 3 shows the representative output currents of normal and rectified TENG modes. If the resulting electrostatic field exceeds the dielectric strength of the air, the partial ionization in the air gap gives rise to the induced electrons in the electrode discharging through the air, eliminating the surface charge on the FEP layer. As the restoring electron flow no longer occurs when the next water droplets touch the FEP surface, only a single direction of electron flow is found over the course of the water dropping and sliding cycles (rectified TENG mode; FIG. 2B), demonstrating the rectified electrical outputs (right signals in FIG. 1G and FIG. 3). In the s-TENGs of the present invention, it is worth noting that the controllable charge distribution determines the strength of the electrostatic field developed on the FEP surface, facilitating the ability to dictate the electron flow direction on demand.

Two factors are critical in achieving switchable power generation. The droplet size impinging onto the s-TENG surface determines the spatial charge distribution, whereas the temporal charge distribution over the surface is governed by the droplet movement. The switchable power generation in TENGs was thoroughly evaluated using a custom measurement setup (FIG. 4A), in which the altitude and sliding angle of droplets being fed by a programmed peristaltic pump were adjusted to systematically regulate spatial and temporal charge distributions. As a maximum spreading diameter of the droplets on the s-TENG surface can be approximated by $d_{max} \propto \sqrt{We} = \sqrt{\rho v^2 d_0/\sigma}$ where We, $\rho$, v, $d_0$, and $\sigma$ denote the Weber number, water density, impinging velocity, droplet diameter before impingement, and surface energy density of the water, respectively [34-38], first the altitude of the feeding nozzle is varied to manage the impinging speed ($v^2 \propto h$). The s-TENGs were anchored to the custom measurement setup with a tilt angle of 45° and analyzed to investigate the maximum spreading area. A low altitude (2.5 cm fall distance) resulted in the lowest spreading area of 72.2 $mm^2$, and this value increased up to 457.07 $mm^2$ for a higher altitude (25 cm fall distance) (FIG. 5A-5F). The maximum diameters were accordingly determined by assuming that the droplet is a circle, demonstrating that the maximum spreading diameter can be successfully modulated by controlling the nozzle altitude (FIG. 5G).

Figure 6:
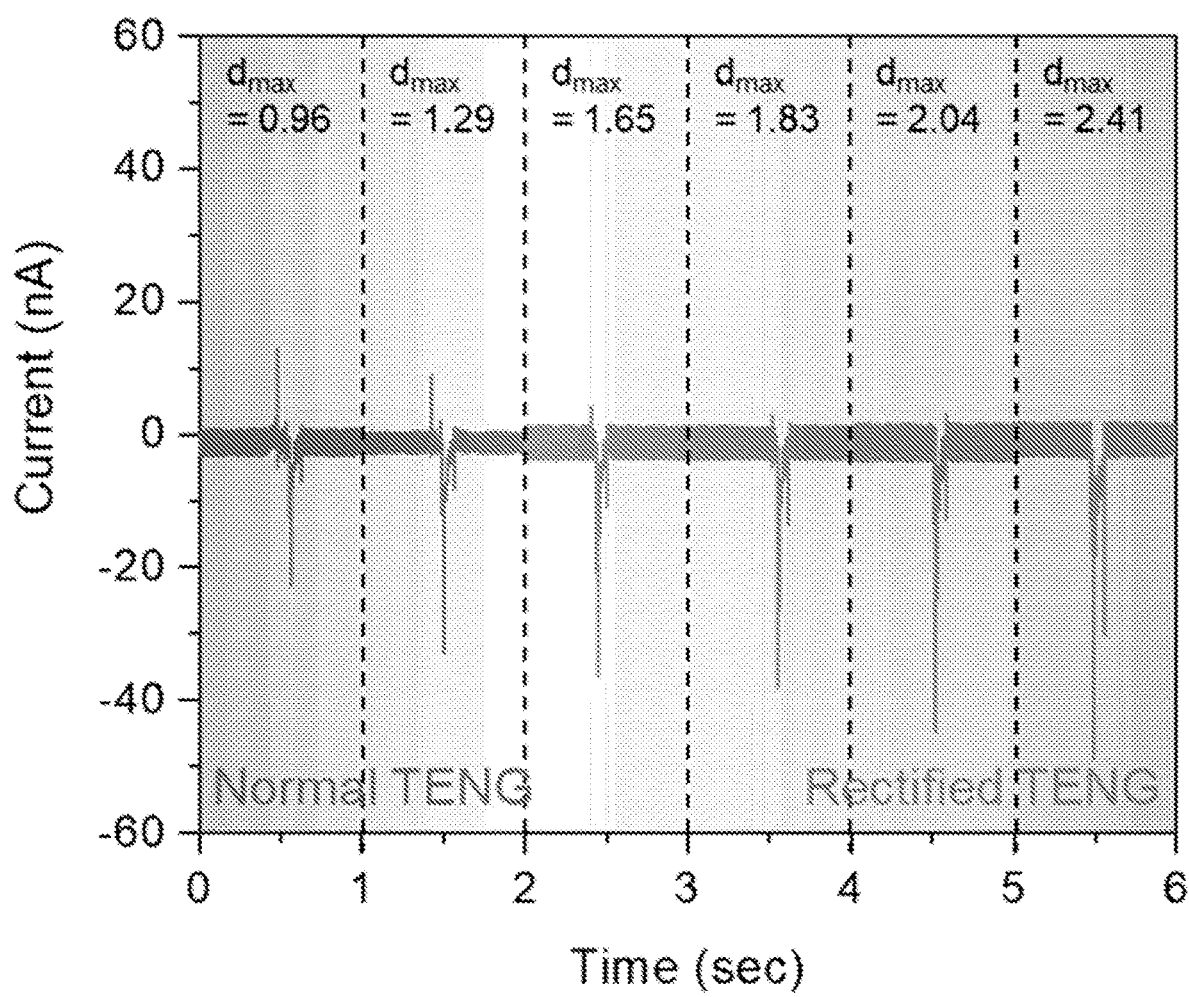
FIG. 6 shows the output current of an s-TENG with various maximum spreading diameters of the droplets on the s-TENG (0.96, 1.29, 1.65, 1.83, 2.04, and 2.41)
Figure 7:
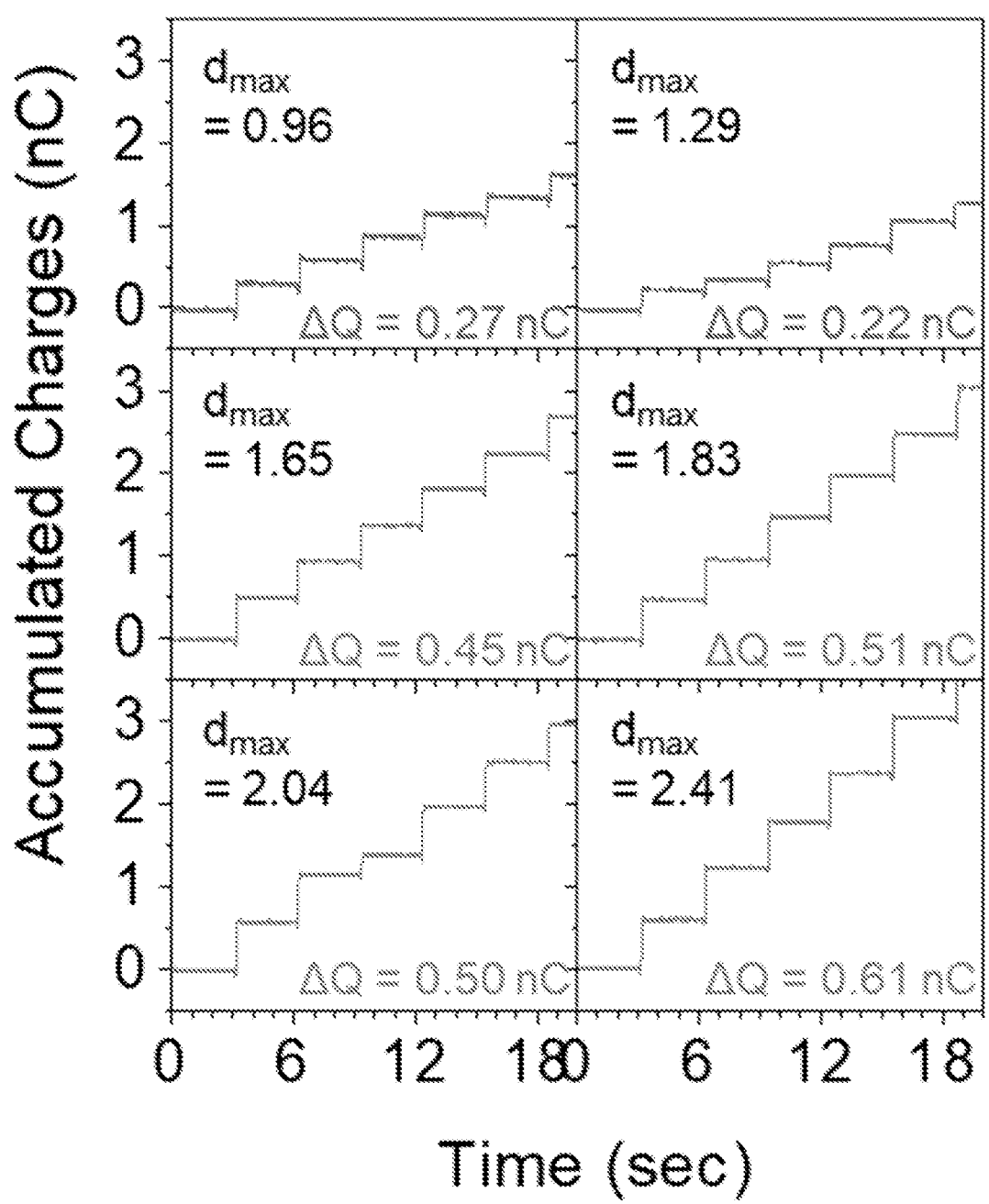
FIG. 7 shows the charges accumulated by various maximum spreading diameters of the droplets on the s-TENG (0.96, 1.29, 1.65, 1.83, 2.04, and 2.41)

The electrical outputs of s-TENGs for given altitudes were further investigated using an oscilloscope equipped with a current preamplifier. Notably, the positive peaks in output voltage and current disappeared with increased maximum spreading diameter (FIG. 4B and FIG. 6), e.g., beyond $d_{max}$=2.04, which can be attributed to the greater spatial charge distribution over the s-TENG surface, surpassing the threshold electrostatic field for dielectric breakdown. An average charge of 0.45, 0.51, 0.50, and 0.61 nC was generated from a single "dropping and sliding" of the water cycle at the spreading diameters of 1.65, 1.83, 2.04, and 2.41 cm, respectively (FIG. 7). In contrast, the charge accumulation in the normal-TENG mode is substantially lower (0.27 and 0.22 nC at the spreading diameters of 0.96 and 1.29 cm, respectively) likely due to the instantaneous discharge when the droplet strikes the surface. The rectification effectiveness of the differing spreading diameters was extracted from the voltage signals using the ratio of negative to positive peaks (FIG. 4C), and the effectiveness was shown to increase with increasing maximum spreading diameter.

Figure 8:
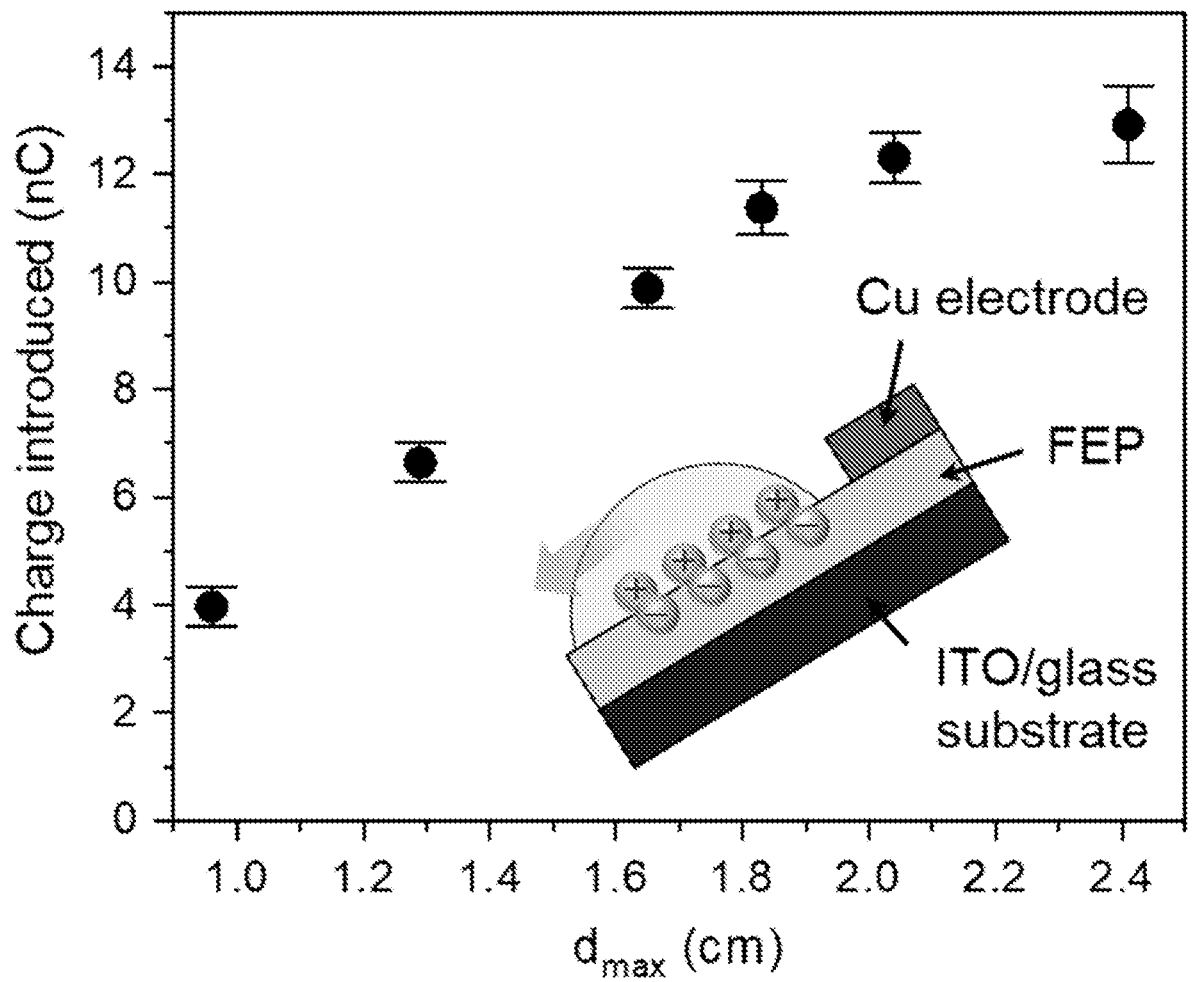
FIG. 8 shows the charges induced by various maximum spreading diameters of the droplets on the s-TENG in the absence of an airgap.
Figure 9:
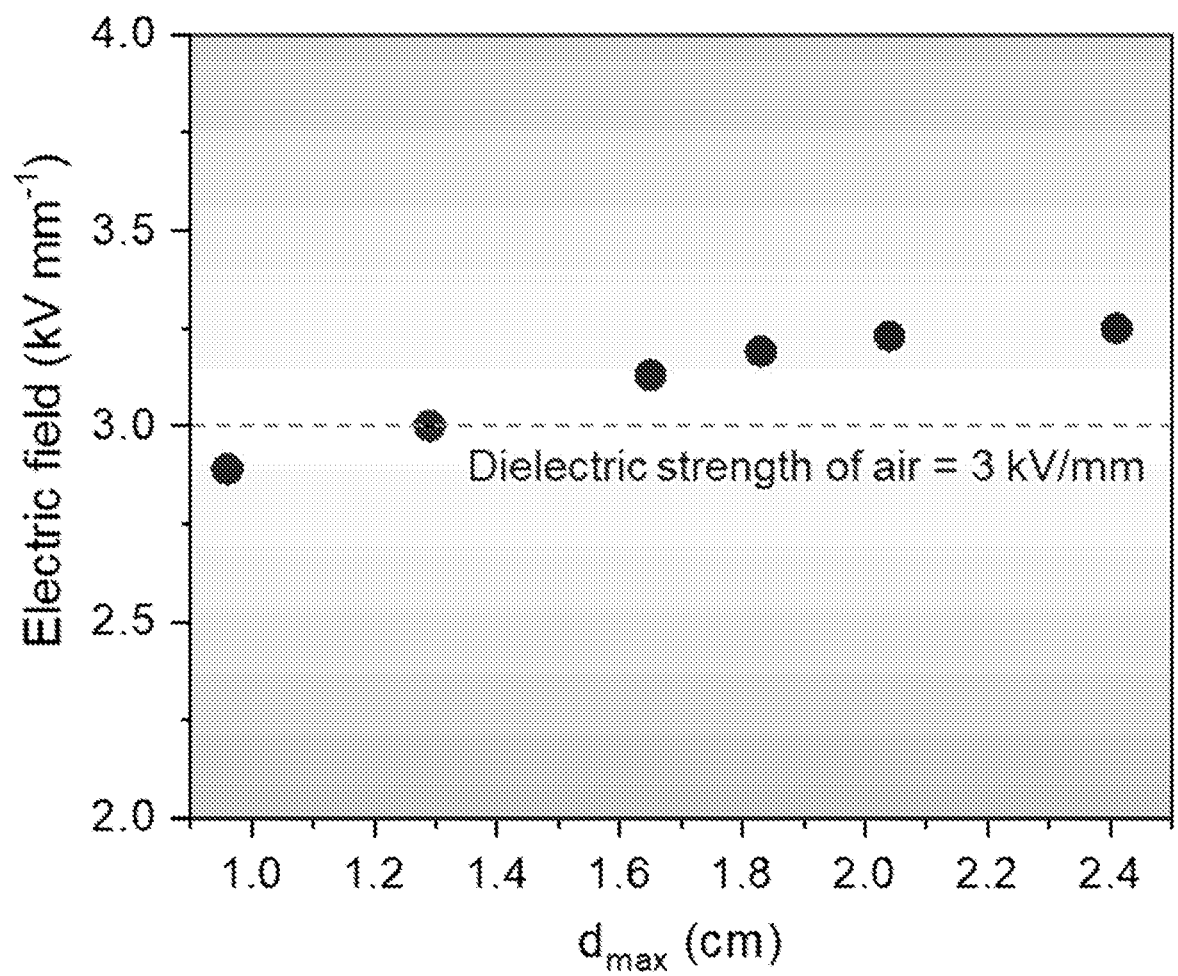
FIG. 9 shows the calculated electric field within the airgap with various maximum spreading diameters of the droplets on the s-TENG.

To gain further insight into the electron flow in the s-TENGs, the electrostatic field within the air gap upon introducing the water droplets was simulated using COMSOL Multiphysics, as shown as a function of spreading diameter (FIG. 4D), in which the amount of surface charge developed by the single droplet was extracted from the TENGs in the absence of an air gap to fully reflect the surface charge developed (FIG. 8). The electric field exceeded the dielectric strength of air (3 kV/mm) [39, 40] when water droplets larger than 1.29 cm touch and roll off the surface (FIG. 9), allowing for the occurrence of dielectric breakdown in the air gap. These results are also consistent with the electrical output data, which indicated that the broader contact electrification facilitates the rectification of the electron flow in the device.

Figure 10:
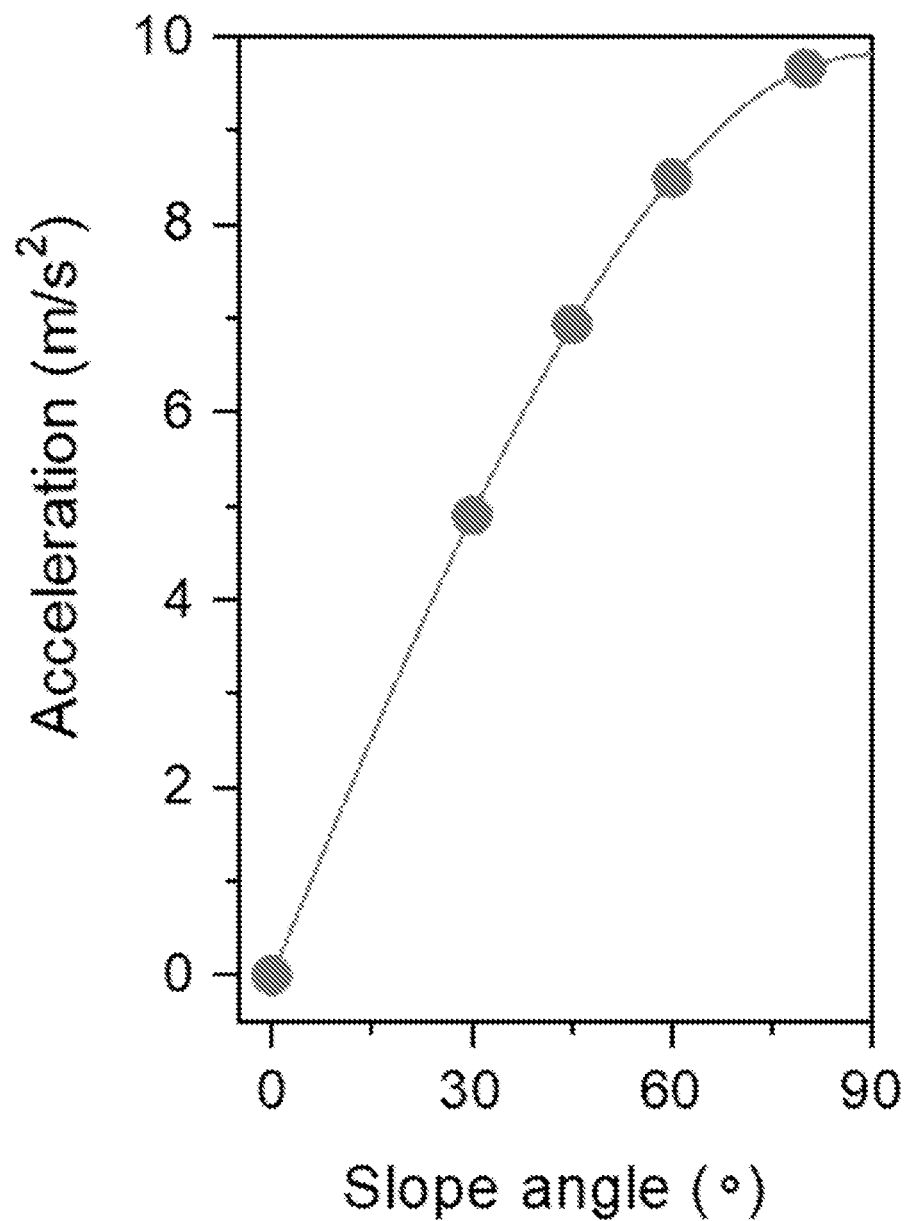
FIG. 10 is a graph of the droplet sliding acceleration as a function of slope angle.
Figure 11A:
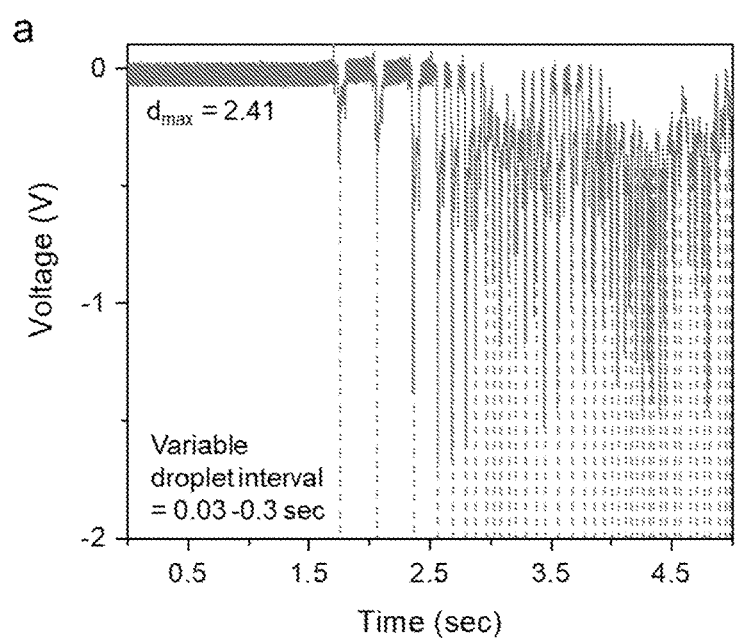
FIG. 11A shows an output voltage of the s-TENG upon applying a droplet with a variable interval and FIG. 11B is a graph of rectification effectiveness as a function of droplet frequency.
Figure 11B:
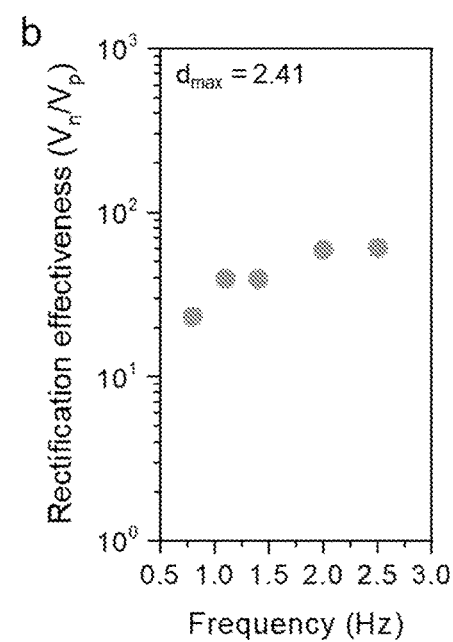

Next, the strategy for alteration in temporal charge distribution was demonstrated by sloping the s-TENGs so as to control the droplet acceleration on the device surface. Slope angles of 0, 30, 45, 60, and 80° were chosen and the droplet acceleration was found to be primarily angle-dependent (a=g sin θ where g and θ are gravitational acceleration and slope angle, respectively), as seen in FIG. 10. When the droplet acceleration on the surface of the s-TENGs was increased, the negative voltage peak of the devices exhibited a significant elevation up to ~23 V, while the positive peak remained about the same, i.e., at less than ~0.1 V, boosting the rectification effectiveness up to ~119 (FIG. 4E). This remarkable performance is attributed to the faster temporal charge distribution, which in turn provides a uniform and localized electric field in the vicinity of the FEP layer with minimal charge loss. The rectification performance remains reasonably stable over 20 cycles at two working modes carried out at the repeated spreading dimeters of 0.96 and 2.41 cm (FIG. 4F), indicating the power generation is switchable under the control of spatial and temporal charge distribution over the surface of the s-TENGs. Furthermore, FIGS. 11A and 11B revealed that the rectification feature is operational even when stimulated with both non-periodic and low frequencies ranging from 0.8 to 2.5 Hz, suggesting that the s-TENGs are suitable for applications in human-interactive mechanical stimuli (0 to 20 Hz) [41]. Ultimately, the ability to switch the power mode with low or even non-periodic frequency excitation renders the s-TENGs of the present invention a promising candidate power module for wearable electronics.

Capacitors are used to analyze the power output rectification of the s-TENGs. Remarkably, capacitors of 1, 4.7, 10, and 47 µF were stably charged up to 10, 4.2, 2.2, and 1.8 V, respectively, within 500 seconds using the rectified TENG mode (FIG. 12A). For comparison, the capacitor charging with normal TENG mode was also evaluated, and the capacitor remained uncharged due to the alternating power output generated from the normal TENG mode. It is noteworthy that the energy delivery of the rectified TENG mode is stable even in the absence of additional rectifiers, which is markedly advantageous given that the rigidity and complexity of conventional rectifiers restrict their direct integration into flexible TENGs.

Light-emitting diodes (LEDs) were successfully lit up with the character pattern 'HKU' using a capacitor fully charged with the rectified TENG mode (FIG. 12B). In addition, the rectified electrical output from the s-TENGs provided the direct lighting of a single LED without any electrical circuit components, including a rectifier and capacitor (FIG. 12C). Both lightings reveal that the s-TENGs of the present invention hold promise as an efficient power source for portable and wearable electronics.

The maximum peak power of s-TENGs in the rectified mode was investigated using differing resistors, with a value of 186.3 µW m$^{-2}$ at a load resistance of 0.5 GΩ (FIG. 12D), which offers sufficient energy for data transfer using low-power wireless technologies, such as Bluetooth and Wi-Fi [42, 43]. The long-term stability was tested for the rectified s-TENG mode under the repetitive water drops. Even after 300 cycles as shown in FIG. 12E, the rectification of the voltage appeared to be stable, demonstrating the outstanding durability and robustness of the device of the present invention. To enhance the output performance of the s-TENG, single double, triple, and quadruple s-TENGs were connected in parallel configuration (FIG. 12F). The output current increased with a greater number of devices, including the highest value of approximately 68 nA with quadruple devices, while the voltage remained similar, demonstrating that the output power of s-TENGs can be successfully tuned by changing the number of devices.

Figure 13B:
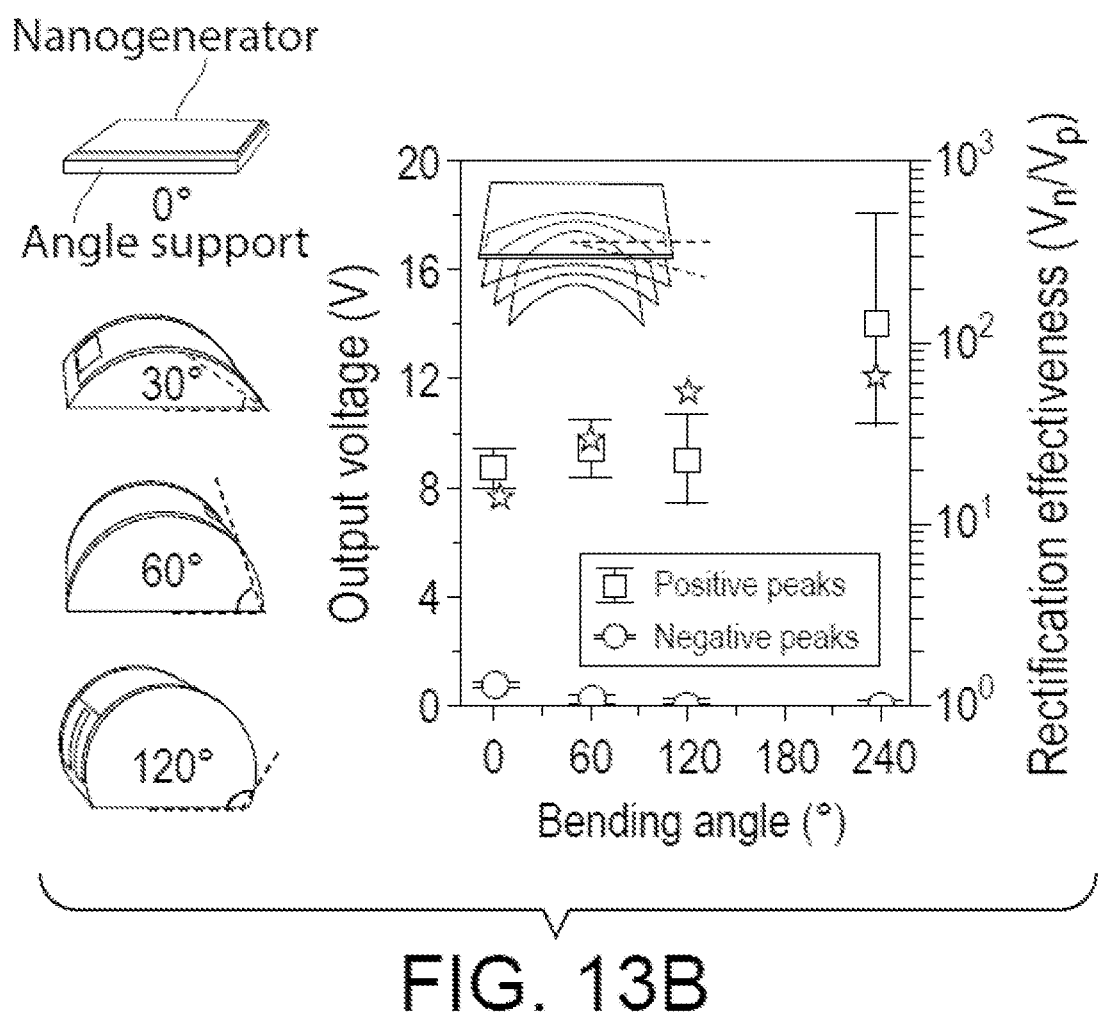
FIG. 13B shows the output voltage and rectification effectiveness as a function of bending angle.

Beyond the rigid s-TENGs, the switchable outputs must be demonstrated in a flexible platform to ensure their applications in wearable electronics. A flexible s-TENG was implemented on an ITO-coated polyethylene terephthalate substrate (FIG. 13A), and a photograph presented in the inset of FIG. 13A suggests the high flexibility of the fabricated s-TENG. In order to investigate the rectification capability of power outputs under bending stimuli, the flexible device was deformed by virtue of 3-dimensional printed variable angle supports (0, 60, 120, and 240°) in which the bending angles were determined to be tangential to the support edge with respect to the undeformed device. For all bending angles, the values of positive and negative peaks were extracted from the voltage outputs at the spreading dimeters of 2.41 cm (FIG. 13B). The negative peaks were found to increase with the bending angle, reaching up to 14.3 V for the bending angle of 240°, while the positive peaks persisted in having low values below 0.6 V. As a result, the rectification effectiveness was shown to be up to approximately 71 for the bending angle of 240°. The exceptionally rectified outputs of bent s-TENGs are likely attributable to the fast acceleration of droplet sliding over the s-TENG surface in tandem with the reduced airgap distance while deformed, which together maximize the electrostatic field in the airgap. The LED lighting was successfully demonstrated in direct connection with deformed s-TENGs.

Figure 14:
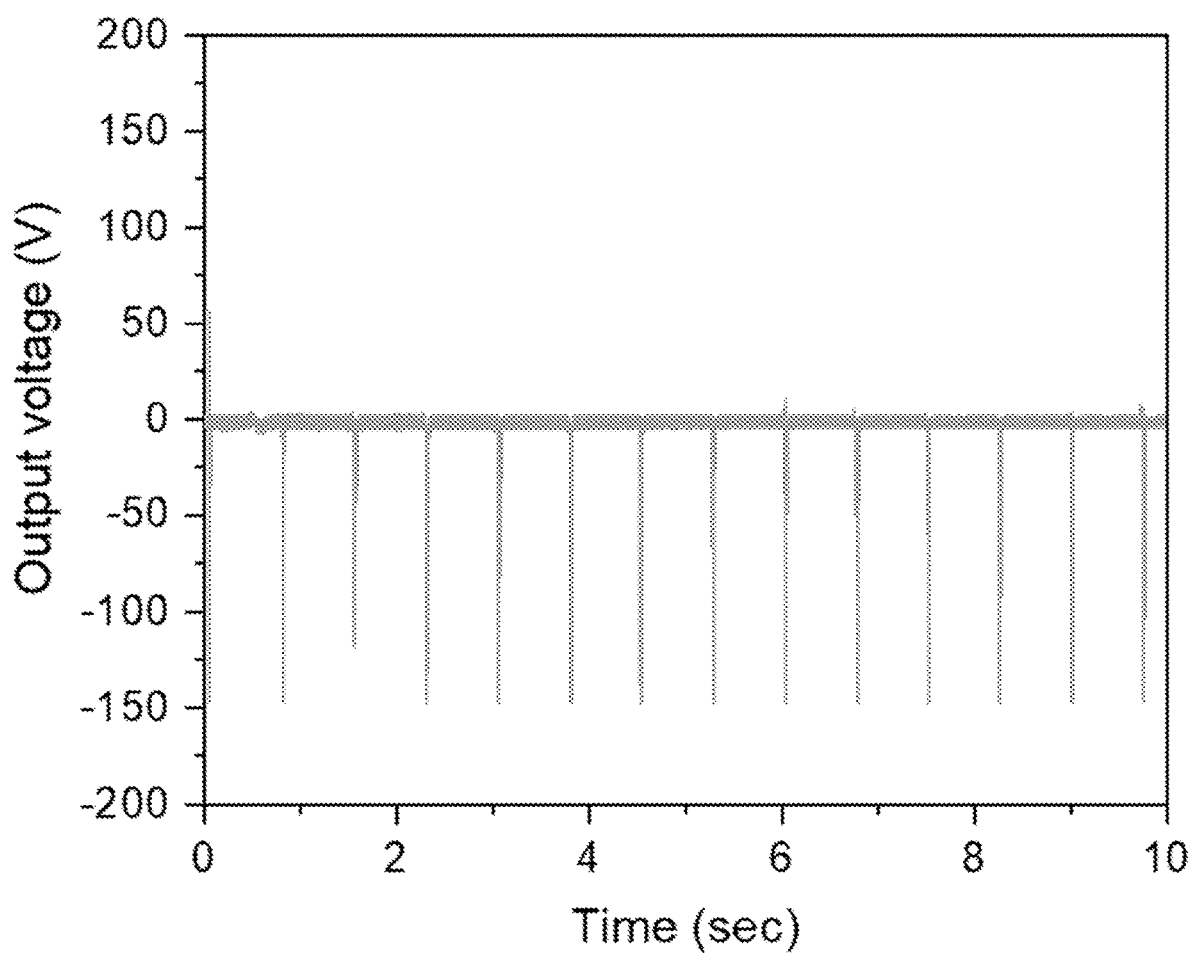
FIG. 14 shows output current of an s-TENG mounted on back of a hand.
Figure 15:
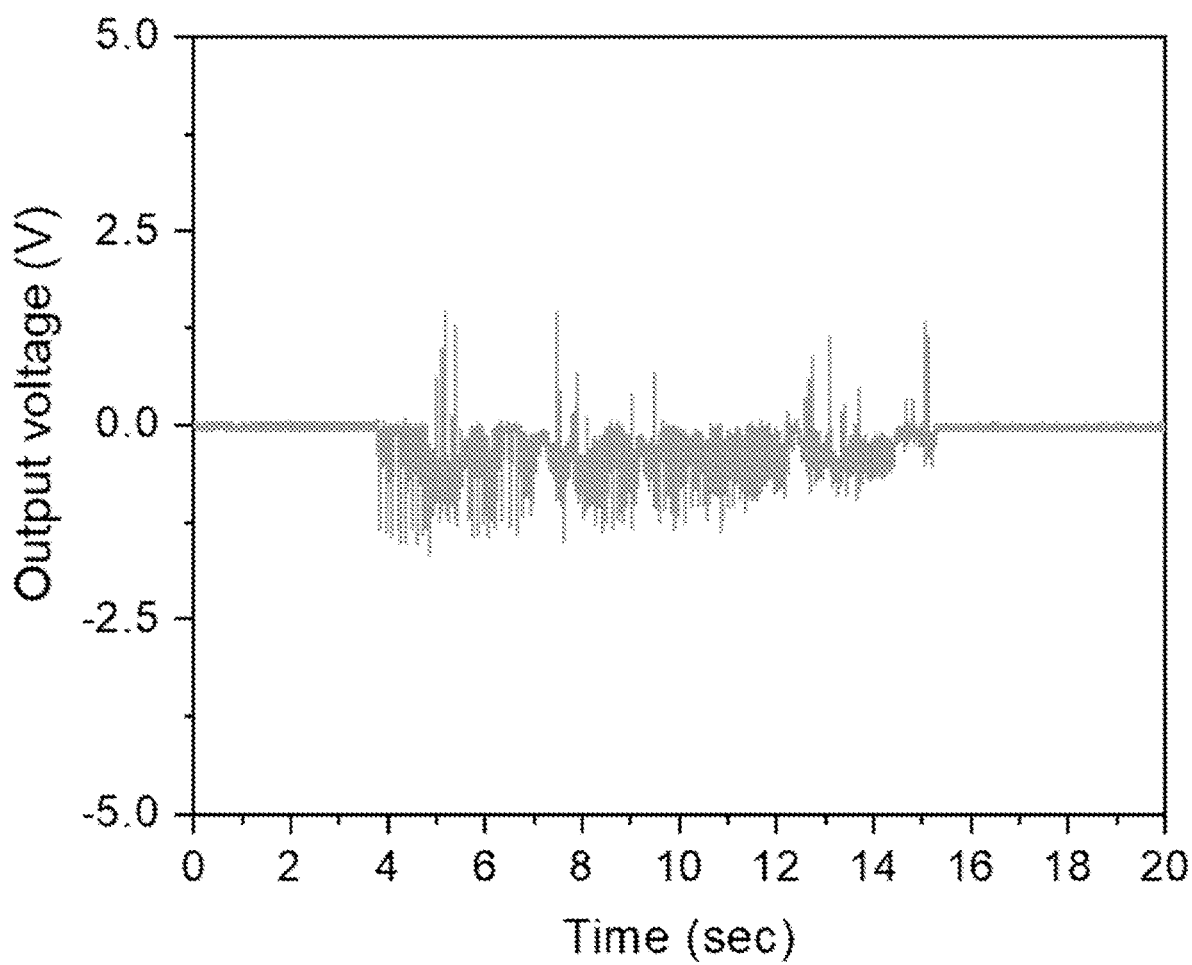
FIG. 15 shows the output voltage of an s-TENG upon applying continuous raindrops.

Practical performance of flexible s-TENGs as power modules was demonstrated for wearable electronics applications. The s-TENGs were readily mounted on the back of a person's hands in the light of high flexibility, and its electric outputs were characterized with water drops having a spreading dimeter of 2.41 cm while the person clenched their first (i.e. deformed device) (insert of FIG. 13C). A rectified output voltage and current of up to ~4.6 V and ~150 nA, respectively, were successfully acquired (FIG. 13C, FIG. 14), suggesting that such a device holds promise for portable or wearable energy harvesting where the device can be exposed to scattered water, especially. For instance, the s-TENGs can be integrated at any location on a raincoat—including the hood, shoulder, elbow, and pocket—to harvest the hydropower of raindrops (FIG. 13D). The s-TENGs provide well-rectified electrical outputs of up to 5 V through manual spraying of the water onto the device surface, and single s-TENGs yielded almost continuous rectified electricity when exposed to continuous raindrops (FIG. 15), offering a simple route to a wearable rectified energy harvesting system for broadband raindrops no matter the heaviness.

Figure 16:
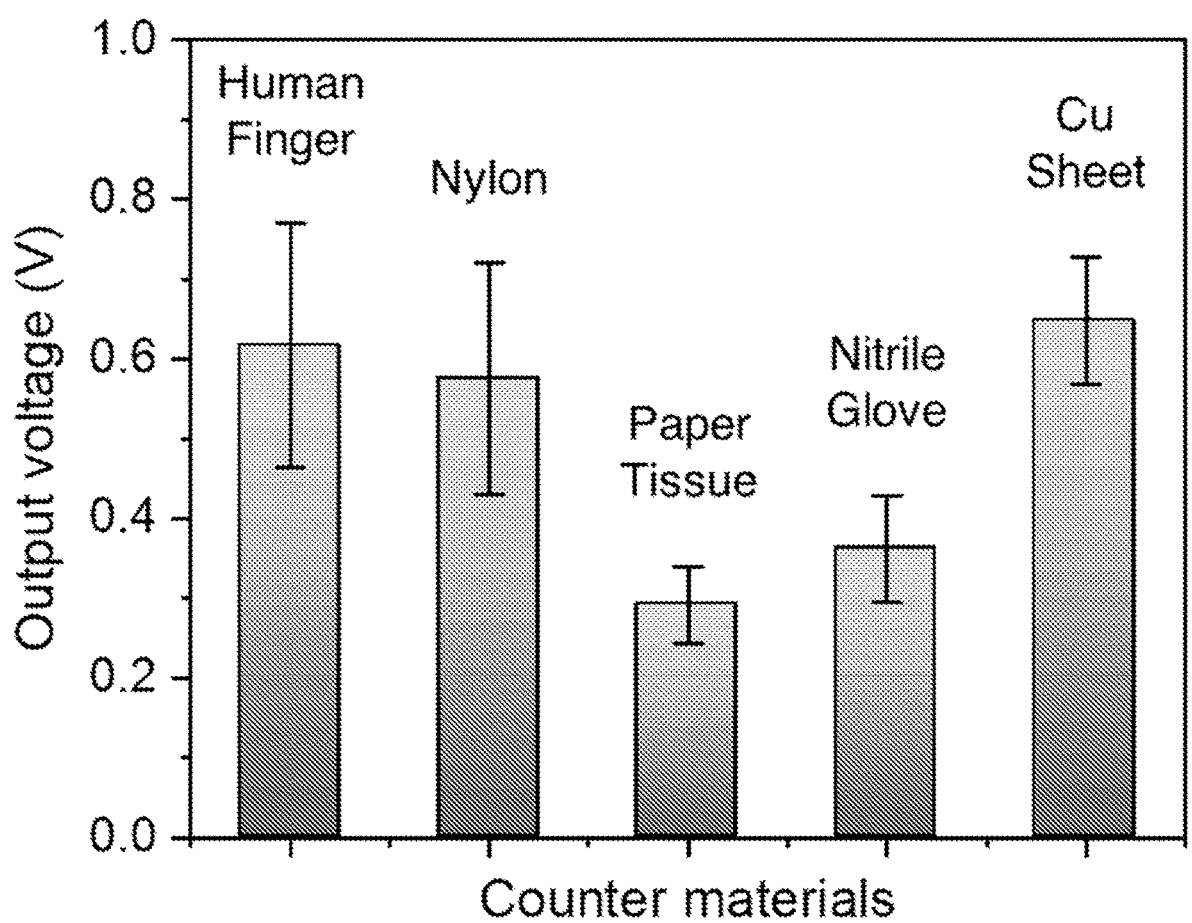
FIG. 16 shows the rectified output voltages of the s-TENGs in contact with various types of counter materials.
Figure 17A:
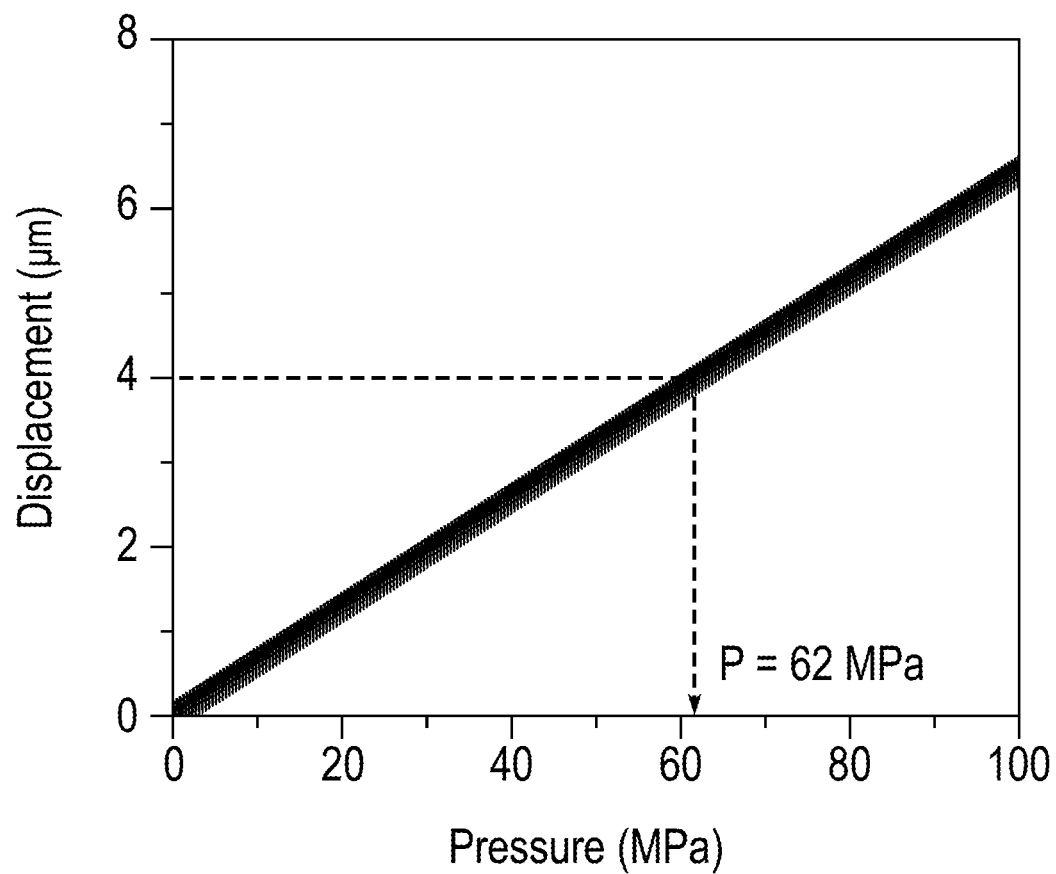
FIG. 17A shows a graph of vertical displacement of an FEP layer as a function of pressure and FIG. 17B is a calculated displacement distribution over the s-TENGs upon applying a pressure of 62 MPa.
Figure 17B:
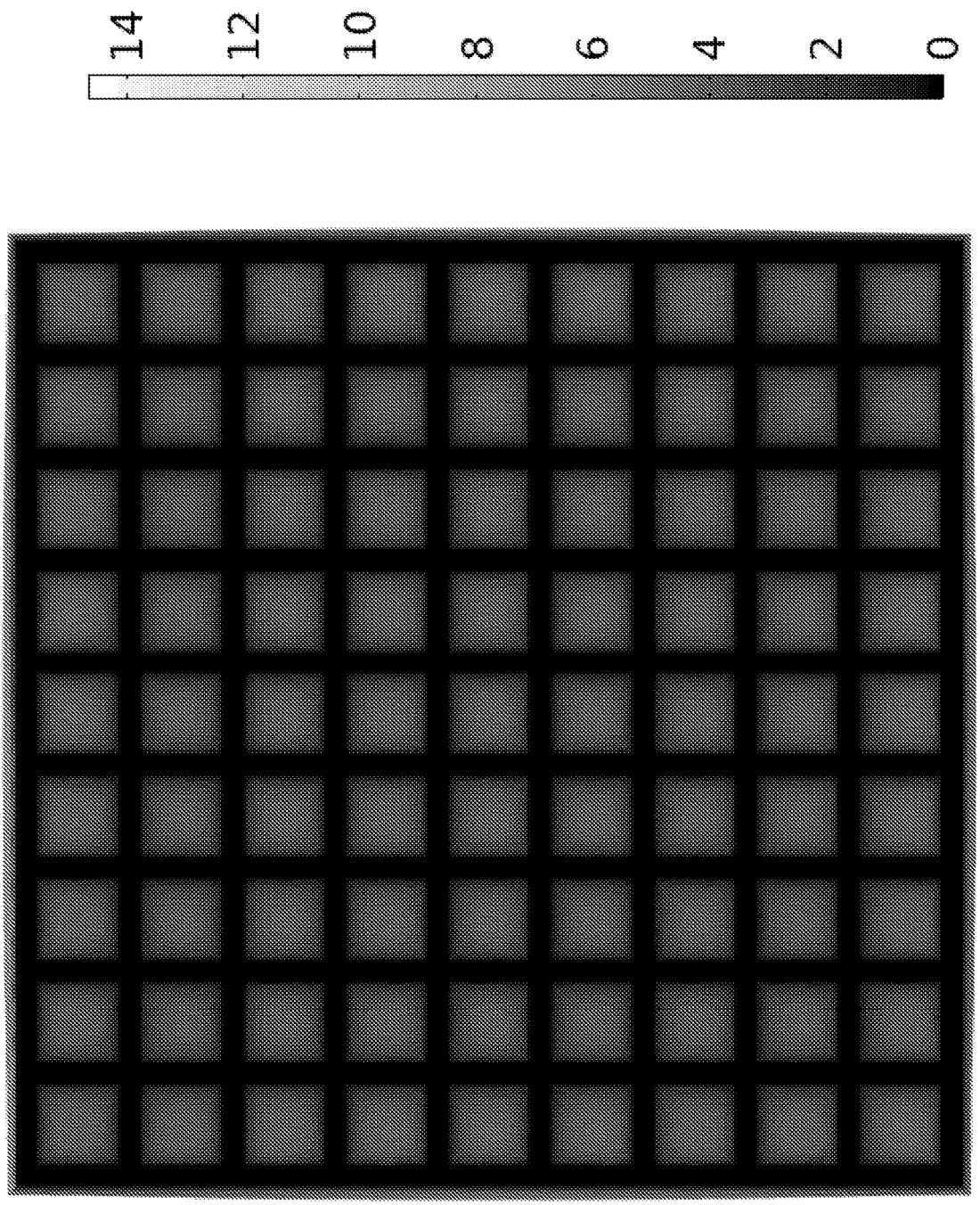

Since the working mechanism underlying the rectification involves the soft impingement and sliding of counter materials for triboelectrification, not limited to water droplets, the rectification competency of s-TENG was verified through manual rubbing with a variety of fabric counter materials to confirm the versatility. Indeed, the well-rectified output voltage was found in s-TENGs in which nylon fibers were slid over the device surface (FIG. 13E), and the level of output voltage can be modified using other fabric counter materials (e.g., human finger, paper tissue, nitrile glove, Cu sheet), being well-matched with the trend of the triboelectric series (FIG. 16) [44, 45]. Eventually, no limitation of choice in counter materials benefits potential wearable applications of the s-TENGs of the present invention in broad research fields such as military, robotics, and smart healthcare as long as the airgap is not destroyed by strong pressure (62 MPa in the presented dimensions, see FIG. 17A). FIG. 17B is a calculated displacement distribution over the s-TENGs upon applying a pressure of 62 MPa and showing that the displacement is in a regular pattern of squares having a displacement of no more than 4 µm.

In the fabrication of a switchable triboelectric nanogenerator the basic structure comprises a defined elastic SU-8 photoresist sandwiched by an indium tin oxide-coated glass (ITO/glass) or polyethylene terephthalate (ITO/PET) substrates and fluorinated ethylene propylene (FEP) film. The ITO-coated substrates (200 nm-thick-ITO) purchased from Luoyang Guluo Glass Co., Ltd was subsequently cleaned with acetone, isopropanol, and deionized water in an ultrasonic cleaner. Then the cleaned substrate was exposed to oxygen plasma (15 standard cubic centimeters per minute (sccm), 200 W, 130 sec) to enhance the wettability of the surface. The negative SU-8 photoresist (GM1060, Gersteltec Co., Ltd.) mold with a 4-µm-thick was added on the ITO-coated substrates by photolithography, with a defined square pore pattern of 40 µm per side and a 50 µm pitch. The adhesive FEP film (Taizhou Chenguang Plastic Industry Co., Ltd) was attached on top of the SU-8 mold, and the FEP surface was etched by reactive ion etching (RIE) treatment with CF$_4$, Ar, and O$_2$ gases at flow rates of 30, 15, and 10 sccm, respectively, for 30 min under a power of 100 W to improve the surface roughness.

In order to characterize the s-TENGs of the present invention, periodic water droplets were fed through a grounded metal needle and applied to the s-TENGs by using a programmed peristaltic pump (Runze Fluid Tech. BT100-2J). Output voltage and current were recorded using an oscilloscope (Agilent DSO-X-2012A) equipped with a pre-amplifier (SRS SR-570) throughout. A digital multimeter (Keithley 6514) was employed to further analyze the charge generated. The angle supports for the bending test were designed to be a fixed bottom area of 30×60 mm$^2$ with an arc of differing angles with respect to the bottom plane, and printed by a 3D printer (PRUSA Original Prusa i3 MK3S+). Transmittance spectra were collected on a UV-Visible-NIR spectrophotometer (Agilent Cary 5000). The wettability and surface morphology of the FEP film were investigated using a Kruss DSA20E Easy Drop Contact Angle Measurement and a field-emission scanning electron microscope (Hitachi S4800), respectively.

To compute the electric field within airgaps, 2D models of s-TENGs featuring FEP and ITO layers separated by a SU-8 pattern were built in COMSOL Multiphysics. The thickness of FEP and ITO layers were set to be 50 and 10 μm, respectively. The SU-8 layer consisted of an array comprising the patterns with a width of 10 μm and thickness of 4 μm and an airgap width of 5 μm. An initial charge density of −23.33 μC/m$^2$ was prescribed for the FEP surface to reflect charge accumulated through previous triboelectrification between the FEP and water droplets. To investigate the effect of the height of water droplets on the electric field, transferred charge of −3.97, −6.64, −9.88, −11.37, −12.31, and −12.92 nC from water droplets, which were obtained from the experiments, was add to the FEP surface for water dropped from the heights of 2.5, 5, 10, 15, 20, and 25 cm respectively. The ITO was grounded as the zero potential reference. For calculation of pressure required to make the contact between FEP and ITO electrode, 3D models comprising a FEP layer stacked on SU-8 pattern consisting of a 9×9 array were built in COMSOL Multiphysics. By fixing the SU-8 patterns, pressures from 1 MPa to 100 MPa in a step of 1 MPa were applied on the top surface of the FEP and the maximum displacement of the bottom surface of the FEP was probed. When the displacement reached up to 4 μm, the FEP and ITO electrode were supposed to start contact since this value was the distance between FEP and ITO.

The present invention is a switchable triboelectric nano-generator, s-TENG, that exhibits outstanding ability to switch power generation modes through control over the electron flow direction with the help of spatial and temporal charge distribution over the device. The s-TENGs yield the electrical outputs with switchable rectification effectiveness up to ~133 upon applying even slow and random mechanical stimuli. The ability to switch the power mode was successfully demonstrated in both rigid and flexible platforms when activated by counter materials, including but not limited to water droplets, fabric, and human fingers, suggesting the versatile s-TENG can be applicable to universal portable and wearable electronics. This new class of fully flexible s-TENGs will pave the way for the development of all-in-one nanogenerators and will speed up the incorporation of nanogenerators into wearable self-powered electronics in the near future. These self-powered wearable devices will play an important role in many aspects of daily life, including wearable electronic payments, wearable healthcare services, smart airport, smart community healthcare, and smart hospital services.

The above are only specific implementations of the invention and are not intended to limit the scope of protection of the invention. Any modifications or substitutes apparent to those skilled in the art shall fall within the scope of protection of the invention. Therefore, the protected scope of the invention shall be subject to the scope of protection of the claims.

REFERENCES

The cited references in this application are incorporated herein by reference in their entirety and are as follows:

[1] Ates, H. C. et al. End-to-end design of wearable sensors. *Nat. Rev. Mater.* 7, 887-907 (2022).
[2] Lin, M., Hu, H., Zhou, S. & Xu, S. Soft wearable devices for deep-tissue sensing. *Nat. Rev. Mater.* 7, 850-869 (2022).
[3] Iqbal, S. M. A., Mahgoub, I., Du, E. et al. Advances in healthcare wearable devices. *npj Flex. Electron.* 5, 9 (2021).
[4] Yang, Q. et al. Categorizing wearable batteries: Unidirectional and omnidirectional deformable batteries. *Matter* 4, 3146-3160 (2021).
[5] Wang, X. F. et al. Flexible Energy-Storage Devices: Design Consideration and Recent Progress. *Adv. Mater.* 26, 4763-4782 (2014).
[6] Armand, M. & Tarascon, J. M. Building better batteries. *Nature* 451, 652-657 (2008).
[7] Tarascon, J. M. & Armand, M. Issues and challenges facing rechargeable lithium batteries. *Nature* 414, 359-367 (2001).
[8] Bu, F., Zhou, W., Xu, Y. et al. Recent developments of advanced micro-supercapacitors: design, fabrication and applications. *npj Flex. Electron.* 4, 31 (2020).
[9] Qin, H., Liu, P., Chen, C. et al. A multi-responsive healable supercapacitor. *Nat. Commun.* 12, 4297 (2021).
[10] Zi, Y. L. & Wang, Z. L. Nanogenerators: An emerging technology towards nanoenergy. *APL Mater.* 5, 074103 (2017).
[11] Xu, S. et al. Self-powered nanowire devices. *Nat. Nanotech.* 5, 366-373 (2010).
[12] Wang, Z. L. Triboelectric nanogenerators as new energy technology for self-powered systems and as active mechanical and chemical sensors. *ACS Nano* 7, 9533-9557 (2013).
[13] Chen, J. et al. Networks of triboelectric nanogenerators for harvesting water wave energy: a potential approach toward blue energy. *ACS Nano* 9, 3324-3331 (2015).
[14] Yoon, H. J., Ryu, H. & Kim, S. W. Sustainable powering triboelectric nanogenerators: Approaches and the path towards efficient use. *Nano Energy* 51, 270-285 (2018).
[15] Wu, C. S., Wang, A. C., Ding, W. B., Guo, H. Y. & Wang, Z. L. Triboelectric Nanogenerator: A Foundation of the Energy for the New Era. *Adv. Energy Mater.* 9, 1802906 (2019).
[16] Wang, Z. L. Triboelectric Nanogenerator (TENG)-Sparking an Energy and Sensor Revolution. *Adv. Energy Mater.* 10, 2000137 (2020).
[17] Fan, F. R., Tian, Z. Q. & Wang, Z. L. Flexible triboelectric generator! *Nano Energy* 1, 328-334 (2012).
[18] Jiang, T. et al. Robust Swing-Structured Triboelectric Nanogenerator for Efficient Blue Energy Harvesting. *Adv. Energy Mater.* 10, 2000064 (2020).

[19] Hinchet, R. et al. Transcutaneous ultrasound energy harvesting using capacitive triboelectric technology. *Science* 365, 491-494 (2019).

[20] Kim, J. et al. Ultrahigh Power Output from Triboelectric Nanogenerator Based on Serrated Electrode via Spark Discharge. *Adv. Energy Mater.* 10, 2002312 (2020).

[21] Yoon, H. J. et al. Microdischarge-Based Direct Current Triboelectric Nanogenerator via Accumulation of Triboelectric Charge in Atmospheric Condition. *Adv. Energy Mater.* 10, 2000730 (2020).

[22] Jeong, J. et al. A Sustainable and Flexible Microbrush-Faced Triboelectric Generator for Portable/Wearable Applications. *Adv. Mater.* 33, 2102530 (2021).

[23] Kim, T. et al. Versatile nanodot-patterned Gore-Tex fabric for multiple energy harvesting in wearable and aerodynamic nanogenerators. *Nano Energy* 54, 209-217 (2018).

[24] Phan, H. et al. Aerodynamic and aeroelastic flutters driven triboelectric nanogenerators for harvesting broadband airflow energy. *Nano Energy* 33, 476-484 (2017).

[25] Amangeldinova, Y., Ma, X. T., Kim, J. M., Shin, D. M. & Hwang, Y. H. Cooperativity of Silver Nanostructures upon Electric Power Generation in Triboelectric Polyimide Layers. *Adv. Eng. Mater.* 24, 2200226 (2022).

[26] Guo, H. et al. A Water-Proof Triboelectric-Electromagnetic Hybrid Generator for Energy Harvesting in Harsh Environments. *Adv. Energy Mater.* 6, 1501593 (2016).

[27] Wang Z. et al. Ultrahigh Electricity Generation from Low-Frequency Mechanical Energy by Efficient Energy Management. *Joule* 5, 441-455 (2021).

[28] Liu, J. et al. Direct-current triboelectricity generation by a sliding Schottky nanocontact on MoS2 multilayers. *Nat. Nanotechnol.* 13, 112-116 (2018).

[29] Huang, X., Xiang, X., Nie, J. et al. Microscale Schottky superlubric generator with high direct-current density and ultralong life. *Nat. Commun.* 12, 2268 (2021).

[30] Wang, J. L. et al. Cylindrical Direct-Current Triboelectric Nanogenerator with Constant Output Current. *Adv. Energy Mater.* 10, 1904227 (2020).

[31] Chen, P. et al. Rationally segmented triboelectric nanogenerator with a constant direct-current output and low crest factor. *Energ. Environ. Sci.* 14, 4523-4532 (2021).

[32] Cheng, R. W. et al. High output direct-current power fabrics based on the air breakdown effect. *Energ. Environ. Sci.* 14, 2460-2471 (2021).

[33] Liu, D. et al. A constant current triboelectric nanogenerator arising from electrostatic breakdown. *Sci. Adv.* 5, eaav6437 (2019).

[34] Josserand, C. & Thoroddsen, S. T. Drop Impact on a Solid Surface. Annu. Rev. *Fluid Mech.* 48, 365-391 (2016).

[35] Visser, C. W. et al. Dynamics of high-speed micro-drop impact: numerical simulations and experiments at frame-to-frame times below 100 ns. *Soft Matter* 11, 1708-1722 (2015).

[36] Chandra, S. & Avedisian, C. T. On the Collision of a Droplet with a Solid-Surface. *Proc. R. Soc. Lond. A* 432, 13-41 (1991).

[37] PasandidehFard, M., Qiao, Y. M., Chandra, S. & Mostaghimi, J. Capillary effects during droplet impact on a solid surface. *Phys. Fluids* 8, 650-659 (1996).

[38] Yonemoto, Y. & Kunugi, T. Analytical consideration of liquid droplet impingement on solid surfaces. *Sci. Rep.* 7, 2362 (2017).

[39] Rigden, J. S. *Macmillan Encyclopedia of Physics* (Macmillan Reference 1st Ed., 1996).

[40] Tipler, P. A. College Physics (Worth Pub, 1987).

[41] Antonsson, E. K. & Mann, R. W. The Frequency Content of Gait. *J. Biomech.* 18, 39-47 (1985).

[42] Mackenzie, J. D. & Ho, C. Perspectives on Energy Storage for Flexible Electronic Systems. *Proc. IEEE* 103, 535-553 (2015).

[43] Mannion, D. P. Comparing Low Power Wireless Technologies-Part 2, https://www.digikey.be/nl/articles/comparing-low-power-wireless-technologies-part-2 Retrieved 2017-12-14.

[44] Lee, J. W., Ye, B. U. & Baik, J. M. Research Update: Recent progress in the development of effective dielectrics for high-output triboelectric nanogenerator. *APL Mater.* 5, 073802 (2017).

[45] Gooding, D. M. & Kaufman, G. K. *Encyclopedia of Inorganic and Bioinorganic Chemistry* (Wiley, 2011).

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A switchable triboelectric nanogenerator (s-TENG) which obtains energy by utilizing the electrostatic potential between water droplets and frictional surfaces, comprising:
a device including an ITO film substrate as an electrode, a molded SU-8 grid located on the ITO film substrate and forming an array of air gaps as an air breakdown region and an FEP film on the molded SU-8 grid as the surface of the friction layer; and
means for variably positioning the device at a distance from and at an angle to a water source so that water droplets from the water source contact the friction layer, so that direct current is obtained without the use of a rectifier due to electrostatic induction causing breakdown in the air breakdown region of the molded SU-8 grid.

2. The switchable triboelectric nanogenerator of claim 1 wherein the molded SU-8 grid is elastic and the ITO film substrate is an indium tin oxide-coated glass (ITO/glass) or a polyethylene terephthalate (ITO/PET) substrate.

3. The switchable triboelectric nanogenerator of claim 1 with a dimension of 25×45 mm$^2$ has a transmittance in the visible range (380-750 nm) of ~85%.

4. The switchable triboelectric nanogenerator of claim 1 wherein the water source is a programmed peristaltic pump providing water drops through a feeding nozzle from a water supply.

5. A switchable triboelectric nanogenerator (s-TENG) which obtains energy by utilizing the electrostatic potential between a counter material and frictional surfaces, comprising:
a device including an ITO film substrate as an electrode, a molded SU-8 grid located on the ITO film substrate and forming an array of air gaps as an air breakdown region, and an FEP film on the molded SU-8 grid as the surface of the friction layer; and
means for causing soft impingement and sliding of counter materials with the surface of the friction layer for triboelectrification, so that direct current is obtained without the use of a rectifier due to electrostatic induction causing breakdown in the air breakdown region of the molded SU-8 grid.

6. The switchable triboelectric nanogenerator of claim 5 wherein the counter materials for triboelectrification comprise any one of a variety of materials, and the impingement and sliding is through manual rubbing.

7. The switchable triboelectric nanogenerator of claim 6 wherein the counter materials include a human finger, nylon, paper tissue, nitrile glove and a Cu sheet.

8. A wearable electronic device powered by the s-TENG of claim 1.

9. The wearable electronic device of claim 8 wherein the device is a raincoat with LEDs powered by at least one s-TENG.

10. The wearable electronic device of claim 8 wherein the device transfers information using low-power wireless technologies.

11. The wearable electronic device of claim 10 wherein the low-power wireless technologies is one of Bluetooth and Wi-Fi.

\* \* \* \* \*